(12) United States Patent
Maruyama et al.

(10) Patent No.: US 10,697,486 B2
(45) Date of Patent: Jun. 30, 2020

(54) LASER WELDED JOINT, VEHICLE COMPONENT, MANUFACTURING METHOD OF LASER WELDED JOINT, AND MANUFACTURING METHOD OF VEHICLE COMPONENT

(71) Applicant: NIPPON STEEL & SUMITOMO METAL CORPORATION, Tokyo (JP)

(72) Inventors: Naoki Maruyama, Kimitsu (JP);
Yasuaki Naito, Kitakyushu (JP);
Shigeru Yonemura, Kisarazu (JP);
Yasunobu Miyazaki, Kimitsu (JP);
Takuya Kuwayama, Kisarazu (JP)

(73) Assignee: NIPPON STEEL CORPORATION, Tokyo (JP)

( * ) Notice: Subject to any disclaimer, the term of this patent is extended or adjusted under 35 U.S.C. 154(b) by 278 days.

(21) Appl. No.: 15/523,874

(22) PCT Filed: Nov. 19, 2015

(86) PCT No.: PCT/JP2015/082553
§ 371 (c)(1),
(2) Date: May 2, 2017

(87) PCT Pub. No.: WO2016/080488
PCT Pub. Date: May 26, 2016

(65) Prior Publication Data
US 2017/0350434 A1    Dec. 7, 2017

(30) Foreign Application Priority Data

Nov. 19, 2014  (JP) ................. 2014-234957

(51) Int. Cl.
*F16B 5/08*   (2006.01)
*C22C 38/00*  (2006.01)
(Continued)

(52) U.S. Cl.
CPC ............. *F16B 5/08* (2013.01); *B21D 22/02* (2013.01); *B21D 53/88* (2013.01); *B23K 26/21* (2015.10);
(Continued)

(58) Field of Classification Search
CPC .............. C21D 9/50; F16B 5/08; B23K 26/21
(Continued)

(56) References Cited

U.S. PATENT DOCUMENTS 6,532,995 B1 *   3/2003   Asahi ..................... C22C 38/04
                                                         138/142
2010/0132855 A1   6/2010   Hasegawa et al.

FOREIGN PATENT DOCUMENTS

EP    1557234 A1   7/2005
EP    2567776 A1   3/2013
(Continued)

OTHER PUBLICATIONS

Chinese Office Action and Search Report for counterpart Chinese Application 201580061499.X, dated Feb. 2, 2018, with English translation of the Chinese Search Report.
(Continued)

*Primary Examiner* — Weiping Zhu
(74) *Attorney, Agent, or Firm* — Birch, Stewart, Kolasch & Birch, LLP

(57) ABSTRACT

A laser welded joint has weld metal provided between a plurality of steel sheets. A chemical composition of the weld metal has predetermined components, and average hardness of the weld metal is 350 to 540 in Vickers hardness. In the weld metal, distribution density of porosities having a diameter of 2 μm to 50 μm is equal to or less than 5.0 pieces/mm². In the weld metal, distribution density of oxide inclusions having a diameter of 3 μm or more is 0.1 to 8.0 pieces/mm².

14 Claims, 3 Drawing Sheets

(51) Int. Cl.
*C22C 38/58* (2006.01)
*B23K 26/21* (2014.01)
*C21D 9/50* (2006.01)
*B23K 35/02* (2006.01)
*C22C 38/12* (2006.01)
*C22C 38/54* (2006.01)
*C22C 38/18* (2006.01)
*C22C 38/38* (2006.01)
*C22C 38/42* (2006.01)
*C22C 38/04* (2006.01)
*B23K 35/30* (2006.01)
*C22C 38/02* (2006.01)
*C22C 38/16* (2006.01)
*C22C 38/06* (2006.01)
*C22C 38/46* (2006.01)
*C22C 38/14* (2006.01)
*C22C 38/08* (2006.01)
*C22C 38/50* (2006.01)
*C22C 38/44* (2006.01)
*C22C 38/48* (2006.01)
*B21D 22/02* (2006.01)
*B21D 53/88* (2006.01)
*B23K 26/26* (2014.01)
*B23K 101/00* (2006.01)
*B23K 103/08* (2006.01)

(52) U.S. Cl.
CPC .......... *B23K 26/26* (2013.01); *B23K 35/0255* (2013.01); *B23K 35/0261* (2013.01); *B23K 35/0266* (2013.01); *B23K 35/3066* (2013.01); *B23K 35/3073* (2013.01); *C21D 9/50* (2013.01); *C22C 38/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/18* (2013.01); *C22C 38/38* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C22C 38/58* (2013.01); *B23K 2101/006* (2018.08); *B23K 2103/08* (2018.08); *C21D 2211/008* (2013.01)

(58) Field of Classification Search
USPC ........................................................ 148/525
See application file for complete search history.

(56) References Cited

FOREIGN PATENT DOCUMENTS

| | | |
|---|---|---|
| EP | 2644731 A1 | 10/2013 |
| EP | 2656964 A1 | 10/2013 |
| JP | 4-297552 A | 10/1992 |
| JP | 7-328703 A | 12/1995 |
| JP | 10-146686 A | 6/1998 |
| JP | 11-293398 A | 10/1999 |
| JP | 11-343538 A | 12/1999 |
| JP | 2000-109946 A | 4/2000 |
| JP | 2002-3984 A | 1/2002 |
| JP | 2006-263814 A | 10/2006 |
| JP | 2007-136496 A | 6/2007 |
| JP | 2012-115840 A | 6/2012 |
| JP | 2012-176434 A | 9/2012 |

OTHER PUBLICATIONS

Extended European Search Report, dated Jul. 18, 2018, for corresponding European Application No. 15862070.8.
International Search Report for PCT/JP2015/082553 dated Feb. 23, 2016.
Joining and welding technology Q&A, Q-04-01-01, [online]1999, The Japan Welding Engineering Society, retrieved on Sep. 24, 2014, total 4 pages, Internet URL:http://www-it.jwes.or.jp/qa/details.jsp?pg_no=0040010010.
Miyazaki et al., "Porosity Formation in $CO_2$ Laser Welding of Steel Sheets", Proceedings of the Japan Welding Society, 2001, vol. 19, No. 2, pp. 241-251.
Miyazaki et al., "Welding Methods and Forming Characteristics of Tailored Blanks (TBs)", Nippon Steel Technical Report, 2003, vol. 378, pp. 35-39, total 6 pages.
Written Opinion of the International Searching Authority for PCT/JP2015/082553 (PCT/ISA/237) dated Feb. 23, 2016.

* cited by examiner

JUST AFTER WELDING

DIFFUSION INITIAL STAGE

DIFFUSION LATER STAGE ns of a vehicle body and improving collision safety. Thus, a high-strength steel sheet having formability similar to that of a low-strength steel sheet in the related art has been developed, and has been practically used for a vehicle body for an automobile (simply referred to as a vehicle body below).

LASER WELDED JOINT, VEHICLE COMPONENT, MANUFACTURING METHOD OF LASER WELDED JOINT, AND MANUFACTURING METHOD OF VEHICLE COMPONENT

TECHNICAL FIELD OF THE INVENTION

The present invention relates to a laser welded joint, a vehicle component, a manufacturing method of the laser welded joint, and a manufacturing method of the vehicle component.

Priority is claimed on Japanese Patent Application No. 2014-234957, filed on Nov. 19, 2014, the content of which is incorporated herein by reference.

RELATED ART

Recently, in an automobile field, a need of using a high-strength steel sheet as a member for a frame, a member for a chassis, and a member for a panel has been increased for reducing the weight of a vehicle body and improving collision safety. Thus, a high-strength steel sheet having formability similar to that of a low-strength steel sheet in the related art has been developed, and has been practically used for a vehicle body for an automobile (simply referred to as a vehicle body below).

In the related art, a vehicle body is assembled in a manner that a plurality of components obtained by performing press forming of a steel sheet is joined to each other by spot welding or arc welding. Recently, in order to reduce the number of components for a vehicle body and to more reduce the weight of the vehicle body, tailored blank (for example, see Non-Patent Document 1) has been used when a vehicle body is manufactured. The tailored blank refers to a technology of performing press forming of a sheet material (also referred to as "a tailored blank material" below) so as to have a desired shape. The tailored blank material is obtained in a manner that a plurality of metal sheets which are different from each other in material, sheet thickness, tensile strength, and the like is butted and welded so as to be integrated. Generally, laser welding is used for butting and welding when a tailored blank material is manufactured.

However, there is a problem in that, if press forming is performed on a tailored blank material obtained by laser-welding high-strength steel sheets, in accordance with precise drawing and bending, a crack occurs in weld metal. Non-Patent Document 1 discloses that, in a tailored blank material manufactured by laser welding, stress may be concentrated at a starting portion and an ending portion for welding due to shrinkage, and thus the tailored blank material may be broken.

Non-Patent Document 2 discloses that, regarding arc welding, in a case where hydrogen exists in weld metal, hydrogen is collected at a stress concentrated portion generated by welding, and thus so-called delayed fracture occurs. It is known that the delayed fracture can be suppressed by preheating before welding or heat treatment after welding.

Patent Documents 1 to 3 disclose a technology for preventing an occurrence of a crack in a weld joint. Specifically, Patent Document 1 discloses that concentration of hydrogen of weld metal in a weld steel pipe obtained by arc-welding a butting portion is set to be equal to or less than a predetermined value, and thus the occurrence of a crack by hydrogen embrittlement when pipe expansion or pipe contraction is corrected can be suppressed.

Patent Document 2 discloses that, in weld metal formed by gas shielded arc welding using a flux-cored wire, a chemical composition is controlled to be in a predetermined range, and number density and volume fraction of residual austenite particles are controlled to be equal to or more than predetermined values, and thus hydrogen embrittlement resistance is improved.

Patent Document 3 discloses that the volume of a porosity at the central part in a thickness direction of a slab is reduced, and thus it is possible to improve hydrogen-induced crack resistance performance of a steel sheet obtained from the slab.

PRIOR ART DOCUMENT

Patent Document

[Patent Document 1] Japanese Unexamined Patent Application, First Publication No. 2006-263814
[Patent Document 2] Japanese Unexamined Patent Application, First Publication No. 2012-176434
[Patent Document 3] Japanese Unexamined Patent Application, First Publication No. 2007-136496

Non-Patent Document

[Non-Patent Document 1] "Welding Methods and Forming Characteristics of Tailored Blanks (TBs)", Sinnittetsu giho (378), p. 35-39, 2003
[Non-Patent Document 2] "Joining and welding technologies Q&A 1000", Q-04-01-01, [online], The Japan Welding Engineering Society, 1999, [searched on Sep. 24, 2014], Internet address <URL:http://www-it.jwes.or.jp/qa/details.jsp?pg_no=0040010010>
[Non-Patent Document 3] "Porosity Formation in $CO_2$ Laser Welding of Steel Sheets", Journal of the Japan Welding Society 19(2), p. 241-251, 2001

DISCLOSURE OF THE INVENTION

Problems to be Solved by the Invention

In a tailored blank material as disclosed in Non-Patent Document 1, a phenomenon as follows is considered as a cause of a crack occurring in weld metal. As described above, in a tailored blank material manufactured by laser welding, shrinkage occurs at a starting portion and an ending portion for welding. It is considered that the shrinkage causes residual stress to occur at the starting portion or the ending portion, and a crack occurs. An insufficient sheet thickness of a laser-welded portion (weld bead portion), which occurs when optimizing laser welding conditions or butting conditions of metal sheet is not possible is also considered as a cause of a crack occurring. However, a crack may occur even when beads are apparently formed well, and describing the cause of a crack occurring is not possible only based on the residual stress and the insufficient sheet thickness of a laser-welded portion. Weld metal at the laser-welded portion is rapidly cooled after welding. Thus, a hard martensite structure having low ductility is generated in the weld metal. Thus, ductility of the weld metal is degraded. The degradation of ductility may be the cause of a crack occurring at a time of forming. However, even in weld metal having the same hardness, a crack may or may not occur at a time of forming, and the cause thereof is not clarified yet.

As described above, delayed fracture disclosed in Non-Patent Document 2 occurs by collecting hydrogen, and can be suppressed by preheating before welding or heat treatment after welding. However, a crack occurring in weld metal when a tailored blank material is press-formed occurs during formation for a short time (within several seconds), and is considered to occur by a cause separate from the cause of delayed fracture occurring by collecting hydrogen. Thus, it is difficult that the occurrence of a crack of weld metal of a tailored blank material is prevent only by preheating before welding or heat treatment after welding.

In the technology of Patent Document 1, in a welded steel pipe obtained by arc welding, the occurrence of a crack by hydrogen embrittlement when pipe expansion or pipe contraction is corrected can be suppressed. However, in a forming type of large deformation with drawing and bending for a short time, as in press forming of a thin steel sheet, an influence of hydrogen on a crack in weld metal is hardly clarified. Laser welding is different from arc welding from a point of a welding mechanism and a welding atmosphere. The cause of a crack occurring in weld metal is quantitatively hardly clarified in addition to the content of hydrogen.

In the technology of Patent Document 2, in weld metal formed by using a flux-cored wire, number density and volume fraction of residual austenite particles are controlled to be equal to or more than predetermined values, and thus hydrogen embrittlement resistance of the weld metal is improved. However, in manufacturing a laser welded joint as a material of a vehicle body, generally, a wire is not used for suppressing an increase of manufacturing cost. In a case where a wire is not used at a time of welding, a structure and a configuration of weld metal are determined in accordance a chemical composition of a material to be welded. Thus, it is difficult that the number density and the volume fraction of residual austenite particles are controlled as in Patent Document 2. Further, in laser welding, a material is melted, and then weld metal is rapidly cooled. Because of this, it is also substantially difficult that the number density and the volume fraction of residual austenite particles are controlled.

In the technology of Patent Document 3, volume of a porosity is reduced, and thus it is possible to improve hydrogen-induced crack resistance performance of a steel sheet. However, a relation between a porosity and a crack occurring in weld metal during a period in which a steel sheet is press-formed is not clarified. Thus, it is difficult that the occurrence of a crack in weld metal when a laser welded joint is press-formed is prevented based on the technology of Patent Document 3.

As described above, when press forming with large plastic strain is performed on a laser welded joint using a high-strength steel sheet, the cause of a crack occurring in weld metal is not clarified. Thus, in the conventional technologies as described above, it is not possible that the occurrence of a crack in weld metal when press forming is performed is sufficiently prevented.

To solve the above-described problems, an object of the present invention is to provide a laser welded joint, a vehicle component, a manufacturing method of the laser welded joint, and a manufacturing method of the vehicle component in which it is possible to suppress an occurrence of a crack in weld metal when press forming is performed.

Means for Solving the Problem

The outline of the present invention is as follows.

(1) According to a first aspect of the present invention, there is provided a laser welded joint including weld metal which is provided between a plurality of steel sheets. The weld metal contains, as a chemical composition, by mass %, 0.05% to 0.30% of C, 0.005% to 3.0% of Si, 0.005% to 1.0% of Al, 0.5% to 6.0% of Mn, more than 0% and 0.04% or less of P, more than 0% and 0.01% or less of S, more than 0% and 0.01% or less of N, more than 0% and 0.01% or less of 0, 0% to 1.0% of Cu, 0% to 0.2% of Nb+Ti+V, 0% to 0.01% of Ca+REM, 0% to 0.01% of B, 0% to 5.0% of Cr, 0% to 10.0% of Ni, 0% to 1.0% of Mo, and a remainder consisting of Fe and impurities. $0.3 \leq Si+200 \times S-2.7 \times C \leq 3.0$ is satisfied. Average hardness of the weld metal is 350 to 540 in Vickers hardness. Distribution density of porosities having a diameter of 2 μm to 50 μm in the weld metal is equal to or less than 5.0 pieces/mm². Distribution density of oxide inclusions having a diameter of 3 μm or more in the weld metal is 0.1 to 8.0 pieces/mm².

(2) In the laser welded joint according to (1), at least one selected from the group consisting of 0.0001% to 1.0% of Cu, 0.0001% to 0.2% of Nb+Ti+V, 0.0001% to 0.01% of Ca+REM, 0.0001% to 0.01% of B, 0.0001% to 5.0% of Cr, 0.0001% to 10.0% of Ni, and 0.0001% to 1.0% of Mo may be contained as a chemical composition of the weld metal, by mass %.

(3) In the laser welded joint according to (1) or (2), an amount $C_H$ of diffusible hydrogen in the weld metal may satisfy the following Expression (a) in a unit of mass ppm.

$$C_H \leq 3.570 - 0.0066 \times HV_{WM} \quad \text{Expression (a)}$$

$HV_{WM}$ in Expression (a) indicates average hardness of the weld metal in Vickers hardness.

(4) In the laser welded joint according to any one of (1) to (3), 80% or more of a metallographic structure in the weld metal may be martensite, and a structure of the martensite may be a bcc structure.

(5) In the laser welded joint according to any one of (1) to (4), a value of Ms represented by the following Expression (b) may be equal to or more than 250.

$$Ms = 561 - 474 \times C - 33 \times Mn - 17 \times Ni - 17 \times Cr - 21 \times Mo \quad \text{Expression (b)}$$

(6) In the laser welded joint according to any one of (1) to (5), at least one of the plurality of steel sheets may be a plated steel sheet.

(7) According to a second aspect of the present invention, there is provided a vehicle component including the laser welded joint described in any one of (1) to (6).

(8) According to a third aspect of the present invention, there is provided a manufacturing method of a laser welded joint which is the laser welded joint described in any one of (1) to (6). The manufacturing method includes performing laser welding of a plurality of steel sheets at a welding rate of 8 m/min or slower in an atmosphere in which absolute humidity is equal to or less than 5 to 25 g/m³, so as to form weld metal for joining the plurality of steel sheets and retaining the plurality of steel sheets after welding, in a temperature range of 10° C. to 100° C. for a time defined by the following Expression (c). The weld metal contains, as a chemical composition, by mass %, 0.05% to 0.30% of C, 0.005% to 3.0% of Si, 0.005% to 1.0% of Al, 0.5% to 6.0% of Mn, more than 0% and 0.04% or less of P, more than 0% and 0.01% or less of S, more than 0% and 0.01% or less of N, more than 0% and 0.01% or less of 0, 0% to 1.0% of Cu, 0% to 0.2% of Nb+Ti+V, 0% to 0.01% of Ca+REM, 0% to 0.01% of B, 0% to 5.0% of Cr, 0% to 10.0% of Ni, 0% to 1.0% of Mo, and a remainder consisting of Fe and impurities. $0.3 \leq Si+200 \times S-2.7 \times C \leq 3.0$ is satisfied.

$$t \geq 7000 \times C - 400 \quad \text{Expression (c)}$$

In Expression (c), t indicates a time in a unit of minute.

(9) In the manufacturing method of a laser welded joint according to (8), the weld metal may contain, as the chemical composition, by mass %, at least one selected from the group consisting of 0.0001% to 1.0% of Cu, 0.0001% to 0.2% of Nb+Ti+V, 0.0001% to 0.01% of Ca+REM, 0.0001% to 0.01% of B, 0.0001% to 5.0% of Cr, 0.0001% to 10.0% of Ni, and 0.0001% to 1.0% of Mo.

(10) In the manufacturing method of a laser welded joint according to (8) or (9), a value of Ms represented by the following Expression (d) may be equal to or more than 250.

$$Ms=561-474\times C-33\times Mn-17\times Ni-17\times Cr-21\times Mo \quad \text{Expression (d)}$$

(11) In the manufacturing method of a laser welded joint according to any one of (8) to (10), at least one of the plurality of steel sheets may be a plated steel sheet.

(12) According to a fourth aspect of the present invention, there is provided a manufacturing method of a vehicle component, which performs press forming on the laser welded joint according to any one of (1) to (6).

(13) According to a fifth aspect of the present invention, there is provided a manufacturing method of a vehicle component, which performs press forming on the laser welded joint manufactured by the manufacturing method according to any one of (8) to (11).

Effects of the Invention

According to the present invention, it is possible to suppress an occurrence of a crack in weld metal of a laser welded joint when press forming is performed. In addition, it is possible to suppress the occurrence of a crack in weld metal in a vehicle component obtained by press-forming a laser welded joint.

EMBODIMENTS OF THE INVENTION

The inventors closely examined in order to clarify a cause of a crack occurring in weld metal when a weld joint as described above is press-formed. As a result, knowledge as follows is obtained.

(A) A crack occurs easier as hardness of the weld metal is large.

(B) As an amount of diffusible hydrogen in the weld metal is increased, an amount of non-diffusible hydrogen in a porosity is increased, and a crack in the weld metal when press forming is performed occurs easier by an influence of internal pressure generated by the hydrogen in the porosity.

(C) A limit amount of diffusible hydrogen, which causes a crack to occur is changed in accordance with hardness of the weld metal.

Figure 1:
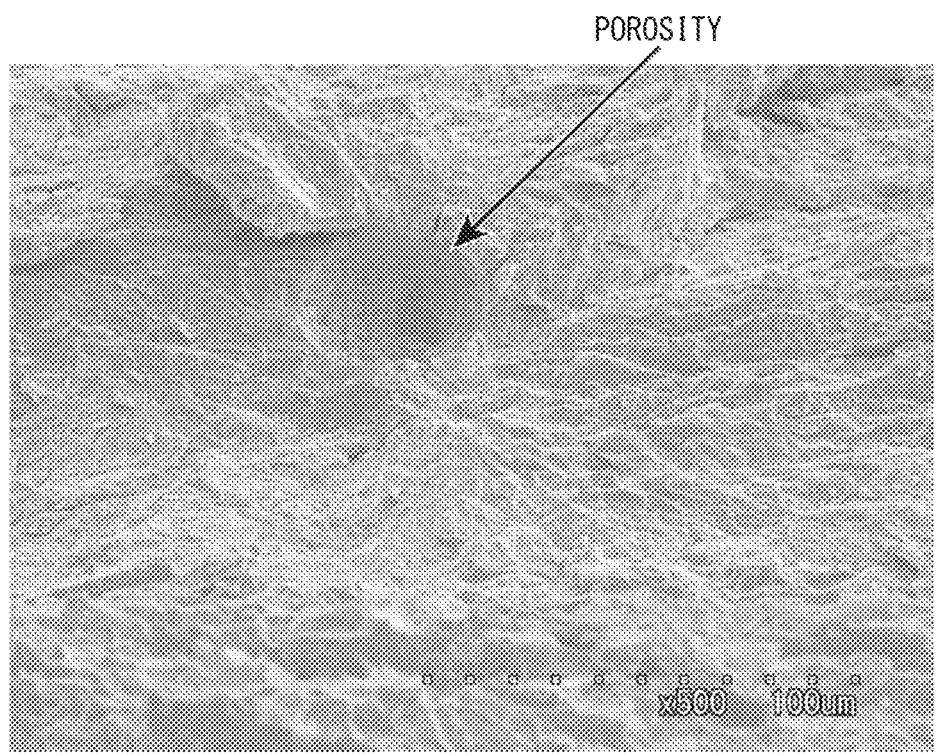
FIG. 1 is an electron microscope picture illustrating a fracture surface of weld metal, in which a crack occurs.

(D) Because there is a case where a porosity (void) as illustrated in FIG. 1 functions as a starting point of brittle fracture, distribution density of porosities having a desired size is controlled to be equal to or less than a predetermined value, and thus it is possible to suppress the occurrence of a crack.

(E) Distribution density of oxide inclusions having a desired size is controlled to be equal to or less than a predetermined value, and thus it is possible to control the occurrence of a crack.

(F) Components of the weld metal are controlled so as to cause a weld pool fluidity index of the weld metal to be in a predetermined range, and thus it is possible to control fluidity of the weld pool at a time of welding, and to reduce distribution density of porosities, which is the cause of a crack occurring.

The present invention is completed based on the above knowledge. A laser welded joint according to the present invention includes a weld joint obtained in a manner that a plurality of steel sheets is joined by so-called laser-arc hybrid welding in which laser welding and arc welding are combined.

Hereinafter, a laser welded joint (simply referred to as a weld joint below) and a manufacturing method thereof according to an embodiment of the present invention will be described. In the following descriptions of a chemical composition, display of "%" for a content of each element means "mass %" in a case of not particularly defined.

A weld joint according to the embodiment is, for example, a tailored blank material, and includes a plurality (for example, two) of steel sheets and weld metal formed at a joint portion of the plurality of steel sheets. The plurality of steel sheets is butted and welded by using laser. Press forming is performed on the weld joint according to the embodiment, and thus a vehicle component is obtained.

A sheet thickness of each of the steel sheets may be 0.5 mm to 4.0 mm. In a case where the steel sheets are used as a vehicle component, the sheet thickness may be 0.6 mm to 2.5 mm. Components of the weld joint will be described below in detail.

1. Average hardness of weld metal: 350 to 540 in Vickers hardness

If average hardness of weld metal is more than 540 in Vickers hardness (also described in HV below), even though distribution density of porosities or oxide inclusions in weld metal is appropriately controlled, and press forming conditions are released, a crack may occur in the weld metal when press forming is performed. Thus, the average hardness of weld metal is set to be equal to or less than 540 in HV.

In a case where the average hardness of weld metal is less than 350 in HV, regardless of distribution density of porosities or oxide inclusions in weld metal, a crack hardly occurs in weld metal when press forming is performed. As described above, an object of the present invention is to prevent the occurrence of a crack in weld metal. Thus, in the present invention, a weld joint in which average hardness of weld metal is equal to or more than 350 in HV is set as a target. Accordingly, the average hardness of weld metal is controlled to be in a range of 350 to 540 in HV. The average hardness of weld metal is preferably equal to or less than 530 in HV, and further preferably equal to or less than 520 in HV.

In a case where the average hardness of weld metal is equal to or more than 370 in HV, a hydrogen crack resulting from hydrogen easily occurs. In a case where it is desired to prevent an occurrence of a hydrogen crack resulting from hydrogen in a case of being equal to or more than 370 in HV, a lower limit value of the average hardness of weld metal may be set to be equal to or more than 370 in HV.

The average hardness is obtained in a manner as follows.

Firstly, a weld joint is cut in a direction vertical to an elongation direction of a welding line and a cross-sectional sample for measuring hardness is produced. Hardness at four points or more of weld metal in the cross-sectional sample is measured with a load of 500 gf or more, by using a Vickers hardness tester. An average value of measured hardness at four points or more is calculated, and is set as average hardness. A measurement point is set to have a point of ¼t (t is a thickness of the weld metal in a sheet thickness direction of the weld joint) from a surface of the weld metal.

2. Distribution density of porosities having a diameter of 2 μm to 50 μm in weld metal: 5.0 pieces/mm² or less A porosity (void) in weld metal is formed when the weld metal is solidified, and functions as a collecting site of non-diffusible hydrogen.

In the related art, as described in Non-Patent Document 3, in porosity control for preventing an occurrence of a press crack, control has been performed on a porosity of about 50 μm or larger, which can be observed by an X-ray microscope. This is because it is conventionally considered that a cause of the occurrence of a press crack is breaking by a decrease of an area of a welded portion which results from existence of a porosity, that is, by degradation of local ductility capability of a welded portion. However, as a result obtained by close examination of the inventors, it is understood that, in a case where many porosities having a particle size which is equal to or less than 50 μm in diameter are provided even though a porosity having a particle size which is more than 50 μm in diameter is controlled, a crack easily occurs in weld metal when press forming is performed. It is supposed that this is because non-diffusible hydrogen is collected in a porosity having a diameter of 2 μM to 50 μm, and thus internal pressure is increased, and a crack occurs in this porosity as a starting point when weld metal is plastic-deformed during press forming.

Thus, in order to suppress the occurrence of a crack in weld metal when press forming is performed, it is important to control distribution density of porosities having a diameter of 2 μm to 50 μm.

Thus, in the weld joint according to the embodiment, distribution density of porosities having a diameter of 2 μm to 50 μm in weld metal is controlled to be equal to or less than 5.0 pieces/mm², preferably equal to or less than 4.0 pieces/mm², and further preferably equal to or less than 3.0 pieces/mm². Thus, the occurrence of a crack when press forming is performed is suppressed.

A lower limit value of the distribution density of porosities of 2 μm or larger in weld metal is not particularly limited. Since an effect is also saturated when the lower limit value is set to be less than 0.01 pieces/mm², the lower limit value may be set to 0.01 pieces/mm².

The distribution density of porosities is obtained in a manner as follows.

Firstly, weld metal is cut in a direction vertical to an elongation direction of a welding line and a cross section obtained by the cutting is subjected to mirror polishing. The cross section subjected to mirror polishing is observed by a scanning electron microscope (SEM). The observation is performed at a magnification of 2000 or more, and at least a region of 250000 μm² or larger in one cross section is observed. Then, the number of porosities having a diameter of 2 μm to 50 μm is counted. Similar observation is performed on two cross sections or more which are different from the above-described cross section. The obtained number of porosities is divided by an observation area, and a value obtained by the division is set as distribution density of porosities. An observation position in the cross section is not particularly designated. However, it is assumed that a region as large as possible in a site which is obviously determined as weld metal is observed. In a case where a boundary between a steel sheet and a weld metal portion after mirror polishing is not clear, it is desired that etching is performed in advance, and a boundary is marked, and thus the weld metal portion is caused to be in a state where the weld metal portion can be obviously determined.

The diameter of a porosity is obtained in a manner that an area of the porosity is obtained, and the obtained area is converted into an equivalent circle diameter.

3. Distribution density of oxide inclusions having a diameter of 3 μm or more in weld metal: 0.1 to 8.0 pieces/mm²

An oxide inclusion having a diameter of 3 μm or more functions as a trap site in which diffusible hydrogen in a metal lattice of weld metal just after welding is trapped. Thus, the oxide inclusion can suppress flowing of diffusible hydrogen into a porosity. Thus, internal pressure by non-diffusible hydrogen in a porosity can be controlled, and thus it is possible to prevent the occurrence of a crack in weld metal when press forming is performed. In order to obtain this effect, in the weld joint according to the embodiment, distribution density of oxide inclusions having a diameter of 3 μm or more is set to be equal to or more than 0.1 pieces/mm². The distribution density of oxide inclusions having a diameter of 3 μm or more is preferably equal to or more than 0.2 pieces/mm², and further preferably equal to or more than 0.3 pieces/mm².

In a case where the distribution density of oxide inclusions having a diameter of 3 μm or more in weld metal is more than 8.0 pieces/mm², a crack may occur at the oxide inclusion as a starting point. Accordingly, in the weld joint according to the embodiment, the distribution density of oxide inclusions having a diameter of 3 μm or more in weld metal is set to be equal to or less than 8.0 pieces/mm², preferably equal to or less than 6.0 pieces/mm², and further preferably equal to or less than 4.0 pieces/mm².

The oxide inclusion is not particularly limited, and includes oxide which is represented as alumina and contains Al as the main component; oxide which contains Si or Mn as the main component; oxide and oxysulfide which contain Mg as the main component; oxide which contains Ti as the main component; oxide and oxysulfide which contains Ca as the main component; oxide and oxysulfide which contain REM (La, Ce, and the like) as the main component; oxide which contains plural types of the above-described elements like (Mg, Ti, Al) oxide; and the like.

The distribution density of oxide inclusions is obtained in a manner as follows.

Firstly, weld metal is cut in a direction vertical to an elongation direction of a welding line and a cross section obtained by the cutting is subjected to mirror polishing. The cross section subjected to mirror polishing is observed by a scanning electron microscope (SEM). The observation is performed at a magnification of 2000 or more, and at least a region of 250000 μm² or larger in one cross section is observed. Then, the number of oxide inclusions having a diameter of 3 μm or more is counted. Similar observation is performed on two cross sections or more which are different from the above-described cross section. The obtained number of oxide inclusions is divided by an observation area, and a value obtained by the division is set as distribution density of oxide inclusions.

The diameter of an oxide inclusion is obtained in a manner that an area of the oxide inclusion is obtained, and the obtained area is converted into an equivalent circle diameter.

Because inclusions other than oxide inclusions are provided in weld metal, element analysis is performed by using EDS (energy dispersive X-ray spectroscopy) or WDS (wavelength dispersive X-ray spectrometry) which is mounted in a SEM. Thus, distinguishment is performed. When distinguishment between a porosity and an inclusion is performed, EDS or WDS is also preferably used.

4. Chemical composition of weld metal

A chemical composition of weld metal of the weld joint according to the embodiment and a reason of limiting the composition will be described below.

C: 0.05 to 0.30%

C is an element which is solid-dissolved in weld metal during welding, and has an influence on hardness and a metallographic structure of the weld metal, and on viscosity of a weld pool when laser welding is performed. The weld metal is rapidly cooled after being molten by laser welding. Thus, the weld metal easily has a martensite structure, and hardness of the weld metal strongly depends on a content of C. If the content of C is less than 0.05%, it is difficult to set hardness of weld metal to be equal to or more than 350 in HV. As described above, in the present invention, a weld joint in which average hardness of weld metal is equal to or more than 350 in HV is set as a target. Accordingly, the content of C is set to equal to or more than 0.05%. From such a viewpoint, the content of C may be set to be equal to or more than 0.10%, 0.15%, or 0.20%.

If the content of C in weld metal is more than 0.30%, the hardness of the weld metal easily becomes more than 540 in HV and a crack easily occurs in the weld metal when press forming is performed. Accordingly, the content of C is set to equal to or less than 0.30%. From such a viewpoint, the content of C is preferably equal to or less than 0.25%, more preferably equal to or less than 0.20%, and more preferably equal to or less than 0.15%.

Si: 0.005 to 3.0%

Si has an effect of controlling phase transformation so as to control components of a metallographic structure of a steel sheet. In addition, Si has an influence on an amount of diffusible hydrogen in weld metal and on formation of a porosity. Thus, Si is important for controlling the occurrence of a crack in weld metal when press forming is performed. If a content of Si in weld metal is more than 3.0%, the reason is not clear, but an amount of diffusible hydrogen inserted in metal lattice during welding is increased. Thus, a crack easily occurs in weld metal when press forming is performed. Further, as the amount of Si is increased, fluidity of a molten portion at a time of welding is increased, and an amount of fine porosities is decreased. The reason is not clear, but, the amount of porosities is reversed to have a tendency of an increase, in a case which is contrary to a case where the content of Si is more than 3.0. Accordingly, the total content of Si is set to be equal to or less than 3.0%. In a case of being considered from such a viewpoint, the total content of Si is preferably equal to or less than 2.3%, more preferably equal to or less than 2.0%, and more preferably equal to or less than 1.7%.

If the content of Si is less than 0.005%, oxide in weld metal is increased, and thus a crack may occur when press forming is performed. Thus, the content of Si is equal to or more than 0.005%, more preferably equal to or more than 0.01%, and more preferably equal to or more than 0.05%.

Al: 0.005 to 1.0%

Similar to Si, Al also has an effect of controlling phase transformation so as to control components of a metallographic structure of a steel sheet. In addition, Al has an influence on an amount of diffusible hydrogen in weld metal, and thus has an influence on an occurrence motion of a crack in the weld metal when press forming is performed. If a content of Al in the weld metal is more than 1.0%, the reason is not clear, but an amount of diffusible hydrogen inserted in metal lattice during welding tends to be increased. Thus, a crack easily occurs in weld metal when press forming is performed. Accordingly, the content of Al is set to be equal to or less than 1.0%. In a case of being considered from such a viewpoint, the total content of Al is preferably equal to or less than 0.8%, more preferably equal to or less than 0.6%, and more preferably equal to or less than 0.4%.

The content of Al may be equal to or more than 0.005%. However, if the content of Al is less than 0.005%, oxide in weld metal is increased, and thus a crack may occur when press forming is performed. In a case of being considered from such a viewpoint, the content of Al is preferably equal to or more than 0.005%, more preferably equal to or more than 0.1%, and more preferably equal to or more than 0.5%.

Mn: 0.5 to 6.0%

Mn is an element which is contained in a steel sheet in order to control a metallographic structure, and, as a result, is contained in weld metal. If a content of Mn is less than 0.5%, hardenability is largely degraded. Thus, even though a large amount of C is contained, it is difficult to stably set hardness of weld metal to be equal to or more than 350 in HV. In the present invention, a weld joint in which average hardness of weld metal is equal to or more than 350 in HV is set as a target. Thus, the content of Mn is set to be equal to or more than 0.5%, preferably equal to or more than 1.0%, and more preferably equal to or more than 1.5%.

If the content of Mn in weld metal is more than 6.0%, weld metal is enbrittled, and thus a crack may occur in the weld metal. Accordingly, the content of Mn is set to be equal to or less than 6.0%, preferably equal to or less than 4.0%, and more preferably equal to or less than 2.0%.

P: more than 0% and 0.04% or less

P may be used for ensuring strength of a steel sheet constituting a joint. However, P is an element which enbrittles a welded portion. Thus, if a content of P is more than 0.04%, a crack occurs regardless of control of distribution of porosities or the amount of diffusible hydrogen. Thus, an upper limit is set to be 0.04%, and preferably 0.03%.

A lower limit has any value as long as the limit is more than 0. However, because, if the lower limit is too low, manufacturing cost such as refining cost is increased, the lower limit may be set to 0.0001%.

S: more than 0% and 0.01% or less

S is an element which allows fluidity of weld metal (melted metal) in welding to be increased, and allows an amount of porosities to be decreased. However, S is an element which enbrittles a welded portion. If a content of S is more than 0.01%, a crack occurs regardless of control of distribution of porosities or distribution density of oxide inclusions. Thus, an upper limit is set to 0.01%.

A lower limit has any value as long as the limit is more than 0. However, because, if the lower limit is too low, manufacturing cost such as refining cost is increased, the lower limit may be set to 0.0001%.

N: more than 0% and 0.01% or less

N is an element used for ensuring strength of a steel sheet constituting a joint, and has an effect of reducing a grain size of weld metal. However, if an amount of N is more than 0.01%, for example, coarse nitride in weld metal is formed, and thus a tendency of enbrittlement becomes stronger. Accordingly, an upper limit thereof is set to 0.01%. A lower limit has any value as long as the limit is more than 0. However, because, if the lower limit is too low, manufacturing cost such as refining cost is increased, the lower limit may be set to 0.0001%.

O: more than 0% and 0.01% or less

O is an element having an influence on distribution of oxide inclusions in weld metal. If a content is more than 0.01%, density of oxide inclusions is increased, and thus a crack for propagating oxide inclusions during press forming is caused to occur. Thus, an upper limit is set to 0.01%.

Weld pool fluidity index α: 0.3 to 3.0

C, Si, and S are elements having an influence on fluidity of a weld pool (melted metal) in welding. Specifically, as the contents of Si and S are increased, fluidity of a weld pool is improved. As the content of C is reduced, fluidity of a weld pool is improved.

In the weld joint according to the embodiment, C, Si, and S control components of weld metal so as to cause a weld pool fluidity index α represented by the following Expression (1) to be 0.3 to 3.0. Expression (1) is obtained considering a degree of an influence on fluidity of a weld pool.

Si, S, and C mean contents (mass %) of elements in weld metal.

$$\text{Weld pool fluidity index } \alpha = Si + 200 \times S - 2.7 \times C \qquad \text{Expression (1)}$$

In a case where the weld pool fluidity index α is less than 0.3, an air involved in a weld pool in welding is hardly discharged outwardly before the weld pool is solidified. Thus, distribution density of porosities in melted metal is increased, and a crack easily occurs in weld metal when press forming is performed. Thus, the weld pool fluidity index α is equal to or more than 0.3, preferably equal to or more than 0.4, and further preferably equal to or more than 0.8.

In a case where the weld pool fluidity index α is more than 3.0, distribution density of porosities tends to be increased. The reason is not clear, but there is a probability of an amount of an air involved in weld metal in welding being increased. Thus, the weld pool fluidity index α is equal to or less than 3.0, preferably equal to or less than 2.5, and further preferably equal to or less than 1.8.

Weld metal may contain one type or more selected from the group consisting of Cr, Ni, Mo, Cu, Nb, Ti, V, Ca, REM, and B which will be described below, in addition to the above-described elements.

Cr: 0% to 5.0%
Ni: 0% to 10.0%
Mo: 0% to 1.0%

Cr, Ni, and Mo are elements which are contained in a steel sheet in order to control a metallographic structure, and, as a result, are contained in weld metal.

Lower limit values of Cr, Ni, and Mo are 0%, but 0.0001% is preferably set as the lower limit values in order to obviously obtain the additional effect.

If a content of Cr is more than 5.0%, a content of Ni is more than 10.0%, and a content of Mo is more than 1.0% in weld metal, the weld metal is enbrittled, and thus a crack may occur in the weld metal. Thus, the content of Cr is set to be equal to or less than 5.0%. The content of Ni is set to be equal to or less than 10.0%. The content of Mo is set to be equal to or less than 1.0%.

(Ms≥250)

If a Ms point of weld metal, which is represented by the following Expression (2) is lower than 250° C. even though the contents of Cr, Ni, and Mo are in the above ranges, a crack may occur in weld metal when press forming is performed. The reason is not clear, but there is a probability of an influence of a configuration of a metallographic structure of weld metal. That is, if the Ms point is lower than 250° C., a proportion of martensite having a bct structure in martensite of weld metal is increased. Thus, a crack may easily occur in weld metal. Accordingly, in a case where one type or more selected from the group consisting of Cr, Ni, and Mo are contained in weld metal, the contents of the elements are preferably determined so as to cause the value of Ms represented by the following Expression (2) to be equal to or more than 250. The contents of the elements are further preferably determined so as to cause the value of Ms to be equal to or more than 280.

$$Ms=561-474\times C-33\times Mn-17\times Ni-17\times Cr-21\times Mo \qquad \text{Expression (2)}$$

In Expression (2), the symbol of each of the elements indicates the content (mass %) of the element contained in weld metal. In a case of not being contained, the symbol indicates zero.

Cu: 0 to 1.0%

Cu is an element which is contained in a steel sheet in order to control a configuration of a metallographic structure as will be described later, and as a result, is contained in weld metal. However, if a content of Cu is more than 1.0%, weld metal is enbrittled, and thus a crack may occur when a weld joint is press-formed. Thus, the content of Cu is preferably set to be equal to or less than 1.0%. A lower limit value of Cu is 0%. However, 0.0001% is preferably set as the lower limit values in order to obviously obtain the additional effect.

Nb, Ti, and V: 0% to 0.2% in total

Nb, Ti, and V have an effect of improving strength of a steel sheet, as precipitation strengthening elements. Nb, Ti, and V are used for refining grains in weld metal after laser welding, and grains at a heat affected zone. However, if the total content of Nb, Ti, and V is more than 0.2%, oxide may be formed in weld metal, and the formed oxide may function as a starting point of a crack when press forming is performed. Thus, the total content of Nb, Ti, and V is preferably equal to or less than 0.2%. A lower limit value of the total content of Nb, Ti, and V is 0%, but 0.0001% is preferably set as the lower limit value in order to obviously obtain the additional effect.

Ca and REM: 0% to 0.01% in total

Ca and REM have an effect of controlling inclusions which function as a starting point of a crack in a base steel sheet and weld metal of a weld joint. However, if the total content of Ca and REM is more than 0.01%, oxide may be formed in weld metal, and the formed oxide may function as a starting point of a crack when press forming is performed. Thus, the total content of Ca and REM is preferably equal to or less than 0.01%. A lower limit value of the total content of Ca and REM is 0%, but 0.0001% is preferably set as the lower limit value in order to obviously obtain the additional effect.

"REM" is a generic term of 17 elements which are the summation of Sc, Y, and lanthanoid. A content of REM means the total content of one type or more of elements in REM. "Lanthanoid" is a generic term of 15 elements which are the summation of elements from La to Lu.

B: 0 to 0.01%

B has an effect of improving strength and toughness of weld metal. However, if a content of B is more than 0.01%, boride may be formed in weld metal, and the formed boride may function as a starting point of a crack when press forming is performed. Thus, the content of B is preferably equal to or less than 0.01%. A lower limit value of B is 0%, but 0.0001% is preferably set as the lower limit value in order to obviously obtain the additional effect.

Remainder: Fe and impurities

Weld metal of a weld joint according to the embodiment contains, for example, the above elements. The remainder consists of Fe and impurities. "Impurities" mean components mixed by a cause, other than raw materials such as ore and scrap, when steel is industrially manufactured. As will be described later, in a case where a plated steel sheet is used as a base steel sheet of a weld joint, elements of a plating material are contained as impurities in weld metal.

In weld metal of a weld joint according to the embodiment, Fe is the main component of the weld metal. If a content of Fe in weld metal is less than 90%, it is difficult to set the Ms point of the weld metal, which is calculated by the above-described Expression (2) to be equal to or higher than 250° C. Thus, the content of Fe is preferably equal to or more than 90%.

5. Obtaining method of chemical composition of weld metal

A chemical composition of weld metal is obtained in a manner as follows. Firstly, only weld metal is cut from a weld joint. Then, a sample is cut out of the weld metal or a welded portion is shown from the weld metal by polishing. Quantitative analysis based on the standards described in Table 1 of JIS G0321(2010) is performed on this sample. Thus, the chemical composition of weld metal can be obtained.

6. Average composition of plurality of steel sheets

The chemical composition of weld metal depends on an average composition and welding conditions of a plurality of steel sheets (base metal) which are joined to each other through the weld metal. Thus, the average composition of a plurality of steel sheets is preferably in a range of the chemical composition of the above-described weld metal. Even though the average composition of a plurality of steel sheets is not in the range of the chemical composition of the above-described weld metal, it is possible to adjust the chemical composition of weld metal by using a welding wire or insert metal in welding. An amount of oxygen can be set to be in a desired range, by adjusting welding conditions.

7. Obtaining method of average composition of steel sheets

An average content of each element is calculated by the following expression, and thus an average composition of a plurality of steel sheets is obtained.

$$X_{ave} = \frac{\sum_{k=1}^{n} t_k \cdot X_k}{\sum_{k=1}^{n} t_k} \qquad \text{Expression (3)}$$

In Expression (3), $X_{ave}$ indicates an average content of a certain element X. $t_k$ indicates a sheet thickness of a k-th steel sheet among n steel sheets. $X_k$ indicates a content of the element X contained in the k-th steel sheet.

For example, in a case where a weld joint is obtained by laser-welding two steel sheets (set to be steel sheets A and B below), if a content of a certain element X in the steel sheet A is set as $X_A$, a sheet thickness of the steel sheet A is set as $t_A$, a content of the element X in the steel sheet B is set as $X_B$, and a sheet thickness of the steel sheet B is set as $t_B$, an average content $X_{ave}$ of the element X in the two steel sheets A and B can be obtained by the following Expression (4). An average content of each element is calculated, and thus an average composition of the two steel sheets can be obtained.

$$X_{ave} = (t_A \cdot X_A + t_B \cdot X_B)/(t_A + t_B) \qquad \text{Expression (4)}$$

Regarding composition analysis of each of the steel sheets, a sample is prepared based on the standards described in Table 1 of JIS G0321(2010), and quantitative analysis is performed on the sample. In this manner, composition analysis of a steel sheet can be performed.

8. Surface treatment of steel sheet

In the weld joint according to the embodiment, plating treatment may be performed on a surface of a steel sheet having the above-described configuration. It is possible to reduce the amount of diffusible hydrogen in weld metal, by using a plated steel sheet as a material of a weld joint. The reason is supposed as follows. A plating component evaporated by welding heat shields a melted metal portion in a gaseous state. As a result, insertion of moisture in a space around melted metal into the melted metal is suppressed. Thus, it is preferable that at least one of a plurality of steel sheets constituting a weld joint is used in a form of a plated steel sheet, and it is more preferable that all of the plurality of steel sheets are used in a form of plated steel sheets. The type of plating is not particularly limited. Various types of plating such as hot dip plating, alloy hot dip plating, and electro plating can be used. A thickness of plating is also not particularly limited. For example, Zn, Ni, Al, Fe, and Sn can be used as a plating material. Alloy plating may be used. Specifically, alloy plating having a composition such as Zn—Sn, Zn—Al—Mg, or Zn—Al—Mg—Si may be used. In a case where a plated steel sheet is used as a base steel sheet of a weld joint, elements of a plating material may be contained as impurities, in a chemical composition of weld metal.

9. Amount (mass ppm) of diffusible hydrogen in weld metal: "3.570−0.0066×$HV_{WM}$" or less As described above, it is considered that a weld metal crack occurred at the time of performing press forming of a weld joint is a crack starting from a porosity. The used porosity has internal pressure increased by collecting non-diffusible hydrogen. Thus, if non-diffusible hydrogen in a porosity can be defined, it is possible to suppress an occurrence of a weld metal crack when press forming of a weld joint is performed. However, defining non-diffusible hydrogen in a porosity is unrealistic. The inventors found that non-diffusible hydrogen in a porosity has a correlation with diffusible hydrogen in metal lattice even though the correlation has a few of a time difference.

Figure 2A:
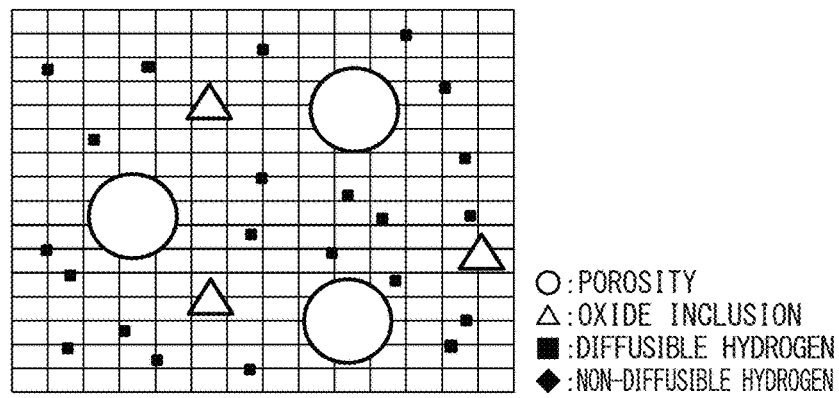
FIG. 2A is a schematic diagram illustrating a motion of hydrogen in a metal lattice and a porosity just after welding.
Figure 2B:
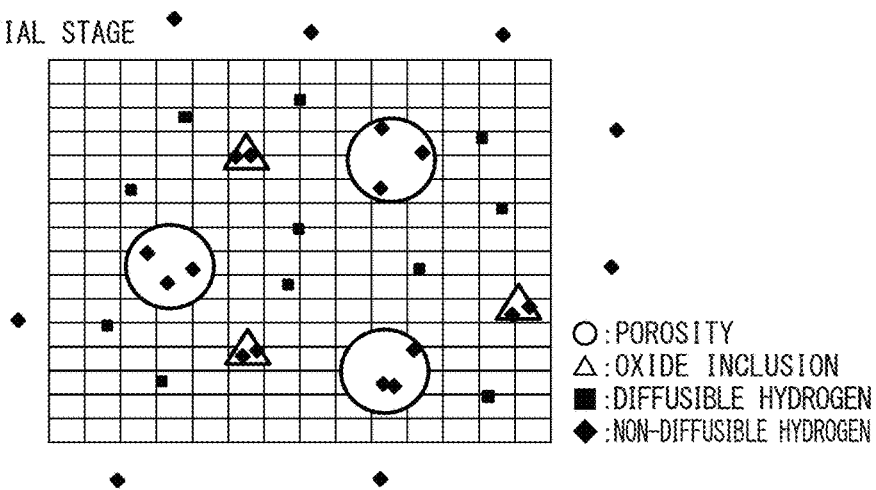
FIG. 2B is a schematic diagram illustrating a motion of hydrogen in the metal lattice and the porosity at a diffusion initial stage.
Figure 2C:
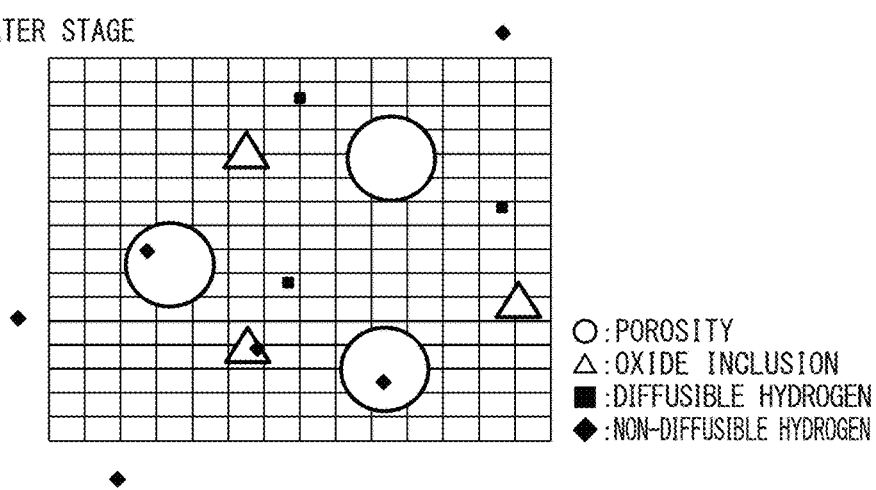
FIG. 2C is a schematic diagram illustrating a motion of hydrogen of the metal lattice and the porosity at a diffusion later stage.

More detailedly, as illustrated in FIG. 2A, just after welding, diffusible hydrogen is in a state of excessively remaining in metal lattice, by dissociation of $H_2O$ in an air in welding. Then, the diffusible hydrogen is (1) discharged from a surface of the steel sheet, is (2) collected in a porosity, or is (3) trapped to an oxide inclusion, as illustrated in FIG. 2B which illustrates a diffusion initial stage. Then, as illustrated in FIG. 2C which illustrates a diffusion later stage, non-diffusible hydrogen collected in a porosity is also discharged out of a metal lattice with time elapsing. Thus, at the diffusion initial stage and the diffusion later stage, an amount of non-diffusible hydrogen in a porosity and an amount of diffusible hydrogen in a metal lattice are correlated with each other.

In a case where the amount of diffusible hydrogen in weld metal is constant, a crack occurs easier in the weld metal as hardness of the weld metal becomes larger. In other words, a limit value (limit diffusible hydrogen amount) of an amount of diffusible hydrogen, which can prevent the occurrence of a crack in weld metal is reduced as hardness of the weld metal becomes larger.

The inventors found that, if an amount $C_H$ (mass ppm) of diffusible hydrogen in weld metal satisfies the following Expression (5), it is possible to suitably suppress the occurrence of a weld metal crack when press forming of a weld joint is performed. The amount $C_H$ is obtained by measuring after retention is performed in a temperature range of 10° C. to 100° C. for a defined retention time t=7000×C−400 (min) after welding.

$$C_H \leq 3.570 - 0.0066 \times HV_{WM} \qquad \text{Expression (5)}$$

Here, $HV_{WM}$ indicates average hardness of weld metal in Vickers hardness.

The defined retention time t is applied at the diffusion later stage illustrated in FIG. 2C. The defined retention time is a period required until the amount of diffusible hydrogen is reduced and an amount of hydrogen in a porosity occurring by reducing the amount of the diffusible hydrogen is decreased. The defined retention time may be equal to or longer than 7000×C−400 (min).

Hydrogen in weld metal is roughly classified into diffusible hydrogen and non-diffusible hydrogen. The amount of diffusible hydrogen in weld metal can be calculated by using a thermal desorption method. Specifically, for example, an amount of hydrogen discharged from weld metal when the weld metal is heated from room temperature to 200° C. at 100° C./h can be measured by gas chromatography, and the amount of diffusible hydrogen can be calculated from the measured amount of hydrogen.

10. Main metallographic structure of weld metal: martensite of bcc (body-centered cubic) structure A metallographic structure of weld metal is a factor having an influence on a crack operation when press forming is performed. The cause is not clear. However, as a result obtained by examination of the inventors, it is understood that, if the main metallographic structure of weld metal is martensite of a bct (body-centered tetragonal) structure, a crack easily occurs in weld metal when press forming is performed. Thus, the main metallographic structure of weld metal is preferably martensite of a bcc structure. The martensite of the bcc structure may be martensite in which carbide is not provided, or be tempering martensite in which iron carbide is precipitated. A residual structure may be one type or two types of bainite and residual austenite.

Here, the main metallographic structure refers to a metallographic structure of 80% or more in area ratio. The metallographic structure of weld metal preferably has martensite of a bcc (body-centered cubic) structure, which is equal to or more than 90% in area ratio. For example, the metallographic structure can be specified by observation of a SEM or a transmission electron microscope (TEM). A crystal structure of martensite can be specified by an X-ray diffraction method, for example. Specifically, lattice constants of an a axis and a c axis of a {100} plane are measured by an X-ray diffraction method, and it is determined whether the crystal structure is cubic (bcc) or a tetragonal (bct), from an axis ratio c/a. In a case where a value of c/a is equal to or less than 1.007, it is assumed that a structure of martensite is a bcc structure.

11. Manufacturing condition of weld joint

The inventors perform various researches for preferable conditions which are used for manufacturing a weld joint having the above-described configuration. Specifically, research for a method for controlling an amount of diffusible hydrogen in weld metal and an amount of porosities is performed. As a result, it is understood that absolute humidity of a welding atmosphere, a welding rate, and heat treatment conditions of a weld joint before formation are appropriately set, and thus it is possible to control the amount of diffusible hydrogen in weld metal and an amount of porosities. Manufacturing conditions of a weld joint will be described below in detail.

Absolute humidity of welding atmosphere: 5 g/m³ to 25 g/m³

Absolute humidity in laser welding has an influence on the amount of diffusible hydrogen in weld metal. Specifically, if the absolute humidity is more than 25 g/m³, the amount of diffusible hydrogen in weld metal is excessive, and thus delayed fracture may occur in weld metal before press forming. If the absolute humidity is more than 25 g/m³, even though heat treatment is performed for a predetermined period before press forming, it is not possible that the amount of diffusible hydrogen remaining in weld metal is sufficiently reduced. Thus, even in a case where delayed fracture does not occur before press forming, a crack easily occurs when press forming is performed. Thus, the absolute humidity in laser welding is set to be equal to or less than 25 g/m³, and preferably equal to or less than 20 g/m³.

If the absolute humidity is less than 5 g/m², hydrogen is trapped, and thus distribution density of oxide inclusions having an effect of inhibiting collecting of hydrogen in a porosity is reduced. It is considered that this is because reduction of moisture content causes an amount of O atoms generated by a dissociation reaction (H$_2$O→2H+0) of H$_2$O which is caused during welding to be reduced, and as a result, an amount of O which performs an oxidation reaction with melted metal is reduced. Thus, the absolute humidity is equal to or more than 5 g/m², preferably equal to or more than 7 g/m², and further preferably equal to or more than 10 g/m².

Welding rate: 8 m/min or slower

A laser welding rate is a factor which has an influence on the amount of diffusible hydrogen in weld metal and the amount of porosities. If a laser welding rate is faster than 8 m/min, the amount of diffusible hydrogen in weld metal and/or the amount of porosities is increased, and a crack easily occurs in the weld metal. Thus, the laser welding rate is equal to or slower than 8 m/min, preferably equal to or slower than 6 m/min, and further preferably equal to or slower than 5 m/min.

Retention temperature of weld joint after welding is ended and before press forming is performed: 10° C. to 100° C.

After laser welding is ended and before press forming is performed, a weld joint is retained at a predetermined temperature in order to reduce the amount of diffusible hydrogen in weld metal. If the retention temperature is lower than 10° C., it is not possible that the amount of diffusible hydrogen is sufficiently reduced. If the retention temperature is higher than 100° C., mechanical characteristics of a steel sheet other than weld metal are changed. Thus, after laser welding is ended and before press forming is performed, a weld joint is preferably retained in a temperature range of 10° C. to 100° C. The retention temperature is preferably equal to or higher than 20° C., and preferably equal to or lower than 80° C.

Retention time (min) of weld joint after welding is ended and before press forming is performed: "7000×C−400" or longer After laser welding is ended and before press forming is performed, a retention time (min) of a weld joint in a temperature range of 10° C. to 100° C. has an influence on the amount of diffusible hydrogen in weld metal. If the retention time is shorter than "7000×C−400", it is not possible that the amount of diffusible hydrogen in weld metal is sufficiently reduced, and a crack easily occurs in weld metal when press forming is performed (C indicates the content (mass %) of C in the weld metal). The retention time t is set to satisfy the following Expression (6), and more preferably the retention time t is set to satisfy the following Expression (7).

$$t(\min) \geq 7000 \times C - 400 \quad \text{Expression (6)}$$

$$t(\min) \geq 8000 \times C - 400 \quad \text{Expression (7)}$$

Even though the amount of diffusible hydrogen in weld metal is reduced, a crack may occur in weld metal when press forming is performed, for a period until the retention time (min) of a weld joint in a temperature range of 10° C. to 100° C. reaches 60 seconds, after laser welding is ended and before press forming is performed. The reason is not clear, but it is supposed as follows. For a period until the retention time reaches 60 seconds, concentration of hydrogen in weld metal is unevenly distributed. Thus, even though an average value of the amount of diffusible hydrogen is reduced, a region in which the concentration of hydrogen is high may be locally provided. Thus, the retention time t may have a lower limit which is set to 60 seconds, preferably 100 seconds, more preferably 180 seconds, in addition to setting of the lower limit value by the above Expression (6) or (7).

Conditions other than the above-described welding conditions are not particularly limited. However, it is known that various conditions such as a gap between steel sheets in welding, an amount of laser beams which are out of a focal point, and a pulse width of laser have an influence on formation of a porosity. Thus, the various conditions are appropriately set in accordance with the type, an output, and the like of laser to be used. The type of a laser oscillator is also not particularly limited. For example, an oscillator of fiber laser, YAG laser, disc laser, semiconductor laser, carbon dioxide gas laser ($CO_2$ laser), and the like can be used. A plurality of steel sheets may be joined to each other by so-called laser-arc hybrid welding using a welding wire. Combination of a sheet thickness is also not particularly limited. However, if a difference in sheet thickness between steel sheets to be welded is more than 2 mm, strain is easily concentrated in weld metal, and a crack easily occurs. Thus, a difference in sheet thickness between steel sheets to be welded is preferably equal to or less than 2 mm.

EXAMPLES

The present invention will be more specifically described below by using examples. However, the present invention is not limited to the examples.

Firstly, each of steel sheets A to Z which had a chemical composition and tensile strength shown in the following Table 1, a width of 25 mm, and a length of 250 mm was prepared. A plurality of steel sheets which corresponded to each of the steel sheets A to Z was prepared. Regarding the steel sheet I, steel sheets having three types of sheet thicknesses (1.0 mm, 1.2 mm, and 1.6 mm) were prepared, and a sheet thickness of other steel sheets was set to 1.2 mm. The steel sheet F is a plated steel sheet (GA) obtained by performing alloy hot-dip galvannealing on a cold-rolled steel sheet. The steel sheet J is a plated steel sheet (GI) obtained by performing hot-dip galvanizing on a cold-rolled steel sheet. Other steel sheets are cold-rolled steel sheets (CR).

TABLE 1

| Steel sheet | | Chemical composition (mass %) Remainder: Fe and impurities | | | | | | | | | | | | Tensile Strength |
|---|---|---|---|---|---|---|---|---|---|---|---|---|---|---|
| Symbol | Type* | C | Si | Al | Mn | Ni | Cr | Mo | P | S | N | O | Others | (MPa) |
| A | CR | 0.015 | 0.13 | 0.01 | 0.7 | 0.01 | 0.01 | — | 0.03 | 0.0006 | 0.002 | 0.005 | — | 310 |
| B | CR | 0.06 | 0.01 | 0.04 | 1.5 | 0.01 | 0.01 | — | 0.03 | 0.0032 | 0.002 | 0.003 | — | 600 |
| C | CR | 0.08 | 0.50 | 0.03 | 2.0 | 0.01 | 0.01 | — | 0.03 | 0.0026 | 0.003 | 0.002 | Cu: 0.03 | 610 |
| D | CR | 0.10 | 0.05 | 0.03 | 1.4 | 0.01 | 0.01 | — | 0.03 | 0.0022 | 0.003 | 0.003 | — | 450 |
| E | CR | 0.10 | 0.50 | 0.03 | 2.0 | 0.01 | 0.3 | — | 0.03 | 0.0028 | 0.003 | 0.004 | Ti: 0.04, B: 0.001 | 1010 |
| F | GA | 0.10 | 0.32 | 0.01 | 2.0 | 0.01 | 0.3 | — | 0.03 | 0.0014 | 0.003 | 0.003 | Ti: 0.04, B: 0.001 | 1010 |
| G | CR | 0.11 | 0.10 | 0.03 | 1.5 | 0.01 | 0.01 | — | 0.04 | 0.0033 | 0.003 | 0.003 | Nb: 0.04 | 620 |
| H | CR | 0.15 | 0.38 | 0.05 | 1.9 | 0.40 | 0.01 | — | 0.02 | 0.0022 | 0.003 | 0.002 | — | 1080 |
| I | CR | 0.20 | 1.30 | 0.10 | 2.1 | 0.01 | 0.01 | 0.1 | 0.02 | 0.0015 | 0.003 | 0.003 | Ti: 0.01 | 1000 |
| J | GI | 0.20 | 1.30 | 0.10 | 2.1 | 0.01 | 0.01 | 0.1 | 0.02 | 0.0015 | 0.003 | 0.002 | Ti: 0.01 | 1000 |
| K | CR | 0.20 | 1.50 | 0.33 | 5.0 | 0.01 | 0.3 | — | 0.02 | 0.0008 | 0.003 | 0.003 | Ca: 0.001, La: 0.001, Ce: 0.001 | 1350 |
| L | CR | 0.20 | 1.50 | 0.33 | 7.0 | 0.01 | 0.01 | — | 0.02 | 0.0008 | 0.002 | 0.004 | — | 1420 |
| M | CR | 0.20 | 0.45 | 0.05 | 1.2 | 9.0 | 0.01 | — | 0.02 | 0.0025 | 0.003 | 0.002 | — | 1020 |
| N | CR | 0.20 | 0.45 | 0.05 | 1.2 | 11.0 | 0.01 | — | 0.02 | 0.0025 | 0.005 | 0.003 | — | 1160 |
| O | CR | 0.20 | 3.20 | 0.04 | 2.4 | 0.01 | 0.01 | — | 0.02 | 0.0018 | 0.003 | 0.003 | — | 1340 |
| P | CR | 0.23 | 1.50 | 0.03 | 2.0 | 0.10 | 0.01 | — | 0.02 | 0.0012 | 0.003 | 0.003 | V: 0.03 | 1090 |
| Q | CR | 0.27 | 1.50 | 0.10 | 2.3 | 0.10 | 0.01 | — | 0.02 | 0.0009 | 0.003 | 0.004 | B: 0.002 | 1180 |
| R | CR | 0.30 | 1.80 | 0.10 | 2.2 | 0.01 | 0.01 | 0.2 | 0.02 | 0.0029 | 0.003 | 0.003 | Nb: 0.02, Ti: 0.02 | 1040 |
| S | CR | 0.40 | 1.30 | 0.40 | 2.0 | 0.01 | 0.2 | — | 0.02 | 0.0005 | 0.004 | 0.004 | — | 1060 |
| T | CR | 0.42 | 1.65 | 0.45 | 4.0 | 0.01 | 0.01 | — | 0.02 | 0.0015 | 0.002 | 0.005 | — | 1330 |
| U | CR | 0.40 | 1.30 | 0.40 | 2.0 | 0.01 | 0.2 | — | 0.02 | 0.0025 | 0.004 | 0.004 | V: 0.2 | 1050 |
| V | CR | 0.40 | 1.30 | 0.40 | 2.0 | 0.01 | 0.2 | — | 0.02 | 0.024 | 0.004 | 0.004 | V: 0.2 | 1040 |
| W | CR | 0.40 | 1.30 | 0.40 | 2.0 | 0.01 | 0.2 | — | 0.18 | 0.0005 | 0.004 | 0.004 | V: 0.2 | 1085 |
| X | CR | 0.40 | 1.30 | 0.40 | 2.0 | 0.01 | 0.2 | — | 0.02 | 0.0005 | 0.004 | 0.01 | V: 0.2 | 1045 |

TABLE 1-continued

| Steel sheet | | Chemical composition (mass %) Remainder: Fe and impurities | | | | | | | | | | | Tensile Strength |
|---|---|---|---|---|---|---|---|---|---|---|---|---|---|
| Symbol | Type* | C | Si | Al | Mn | Ni | Cr | Mo | P | S | N | O | Others | (MPa) |
| Y | CR | 0.40 | 1.30 | 0.40 | 2.0 | 0.01 | 0.2 | — | 0.02 | 0.0005 | 0.004 | 0.02 | V: 0.2 | 1045 |
| Z | CR | 0.40 | 1.30 | 0.40 | 2.0 | 0.01 | 0.2 | — | 0.02 | 0.0005 | 0.018 | 0.004 | V: 0.2 | 1045 |

*CR: cold-rolled steel sheet, GI: hot-dip galvanized steel sheet, GA: galvannealed steel sheet Then, two steel sheets were appropriately selected from the steel sheets A to Z. The two selected steel sheets were butted and welded by using YAG laser. Thus, weld joints 1 to 57 which had a straight welding line at the central portion, and had a width of 50 mm and a length of 250 mm were manufactured. Then, heat treatment was performed on the weld joints 1 to 57 (at 30° C. for a predetermined retention time).

The following items are shown in the following Table 2 and Table 3.
(a) "Combination of steel sheets"
(b) "Sheet thickness (mm)"
(c) "Chemical composition (mass %) of weld metal"
(d) "Ms of steel sheet"
(e) "Index α" . . . weld pool fluidity index indicated by Si+200S−2.7C

TABLE 2

| Joint No. | Combination of steel sheets | Sheet thickness (mm) | Chemical composition (mass %) of weld metal Remainder: Fe and impurities | | | | | | | | | | | | Ms⁻ of steel sheet | Index α |
|---|---|---|---|---|---|---|---|---|---|---|---|---|---|---|---|---|
| | | | C | Si | Al | Mn | Ni | Cr | Mo | P | S | N | O | Others | | |
| <u>1</u> | A-A | 1.2-1.2 | <u>0.015</u> | 0.13 | 0.01 | 0.7 | 0.01 | 0.01 | — | 0.03 | 0.0006 | 0.0024 | 0.0048 | — | 530 | <u>0.21</u> |
| <u>2</u> | B-B | 1.2-1.2 | 0.06 | 0.01 | 0.04 | 1.5 | 0.01 | 0.01 | — | 0.03 | 0.0032 | 0.0021 | 0.0032 | — | 482 | 0.49 |
| 3 | B-B | 1.2-1.2 | 0.06 | 0.01 | 0.04 | 1.5 | 0.01 | 0.01 | — | 0.03 | 0.0032 | 0.0021 | 0.0032 | — | 482 | 0.49 |
| 4 | C-C | 1.2-1.2 | 0.08 | 0.50 | 0.03 | 2.0 | 0.01 | 0.01 | — | 0.03 | 0.0026 | 0.0025 | 0.0021 | Cu: 0.03 | 457 | 0.80 |
| 5 | C-C | 1.2-1.2 | 0.08 | 0.50 | 0.03 | 2.0 | 0.01 | 0.01 | — | 0.03 | 0.0026 | 0.0025 | 0.0021 | Cu: 0.03 | 457 | 0.80 |
| <u>6</u> | C-C | 1.2-1.2 | 0.08 | 0.50 | 0.03 | 2.0 | 0.01 | 0.01 | — | 0.03 | 0.0026 | 0.0025 | 0.0021 | Cu: 0.03 | 457 | 0.80 |
| <u>7</u> | C-C | 1.2-1.2 | 0.08 | 0.50 | 0.03 | 2.0 | 0.01 | 0.01 | — | 0.03 | 0.0026 | 0.0025 | 0.0021 | Cu: 0.03 | 457 | 0.80 |
| <u>8</u> | D-D | 1.2-1.2 | 0.10 | 0.05 | 0.03 | 1.4 | 0.01 | 0.01 | — | 0.03 | 0.0022 | 0.0028 | 0.0028 | — | 467 | <u>0.22</u> |
| 9 | E-E | 1.2-1.2 | 0.10 | 0.50 | 0.03 | 2.0 | 0.01 | 0.3 | — | 0.03 | 0.0028 | 0.0025 | 0.0038 | Ti: 0.04, B: 0.001 | 442 | 0.79 |
| 10 | F-F | 1.2-1.2 | 0.10 | 0.32 | 0.01 | 2.0 | 0.01 | 0.3 | — | 0.03 | 0.0014 | 0.0025 | 0.0025 | Ti: 0.04, B: 0.001 | 442 | 0.33 |
| 11 | G-G | 1.2-1.2 | 0.11 | 0.10 | 0.03 | 1.5 | 0.01 | 0.01 | — | 0.04 | 0.0033 | 0.0027 | 0.0025 | Nb: 0.04 | 459 | 0.46 |
| 12 | H-H | 1.2-1.2 | 0.15 | 0.38 | 0.05 | 1.9 | 0.40 | 0.01 | — | 0.02 | 0.0022 | 0.0025 | 0.0022 | — | 420 | 0.42 |
| 13 | I-I | 1.2-1.2 | 0.20 | 1.30 | 0.10 | 2.1 | 0.01 | 0.01 | 0.1 | 0.02 | 0.0015 | 0.0030 | 0.0028 | Ti: 0.01 | 394 | 1.06 |
| 14 | I-I | 1.2-1.2 | 0.20 | 1.30 | 0.10 | 2.1 | 0.01 | 0.01 | 0.1 | 0.02 | 0.0015 | 0.0030 | 0.0028 | Ti: 0.01 | 394 | 1.06 |
| <u>15</u> | I-I | 1.2-1.2 | 0.20 | 1.30 | 0.10 | 2.1 | 0.01 | 0.01 | 0.1 | 0.02 | 0.0015 | 0.0030 | 0.0028 | Ti: 0.01 | 394 | 1.06 |
| <u>16</u> | I-I | 1.2-1.2 | 0.20 | 1.30 | 0.10 | 2.1 | 0.01 | 0.01 | 0.1 | 0.02 | 0.0015 | 0.0030 | 0.0028 | Ti: 0.01 | 394 | 1.06 |
| <u>17</u> | I-I | 1.2-1.2 | 0.20 | 1.30 | 0.10 | 2.1 | 0.01 | 0.01 | 0.1 | 0.02 | 0.0015 | 0.0030 | 0.0028 | Ti: 0.01 | 394 | 1.06 |
| 18 | I-I | 1.2-1.2 | 0.20 | 1.30 | 0.10 | 2.1 | 0.01 | 0.01 | 0.1 | 0.02 | 0.0015 | 0.0030 | 0.0028 | Ti: 0.01 | 394 | 1.06 |
| 19 | I-I | 1.2-1.2 | 0.20 | 1.30 | 0.10 | 2.1 | 0.01 | 0.01 | 0.1 | 0.02 | 0.0015 | 0.0030 | 0.0028 | Ti: 0.01 | 394 | 1.06 |
| <u>20</u> | I-I | 1.2-1.2 | 0.20 | 1.30 | 0.10 | 2.1 | 0.01 | 0.01 | 0.1 | 0.02 | 0.0015 | 0.0030 | 0.0028 | Ti: 0.01 | 394 | 1.06 |
| <u>21</u> | I-I | 1.2-1.2 | 0.20 | 1.30 | 0.10 | 2.1 | 0.01 | 0.01 | 0.1 | 0.02 | 0.0015 | 0.0030 | 0.0028 | Ti: 0.01 | 394 | 1.06 |
| <u>22</u> | I-I | 1.2-1.2 | 0.20 | 1.30 | 0.10 | 2.1 | 0.01 | 0.01 | 0.1 | 0.02 | 0.0015 | 0.0030 | 0.0028 | Ti: 0.01 | 394 | 1.06 |
| <u>23</u> | I-I | 1.2-1.2 | 0.20 | 1.30 | 0.10 | 2.1 | 0.01 | 0.01 | 0.1 | 0.02 | 0.0015 | 0.0030 | 0.0028 | Ti: 0.01 | 394 | 1.06 |
| 24 | I-I | 1.0-1.6 | 0.20 | 1.30 | 0.10 | 2.1 | 0.01 | 0.01 | 0.1 | 0.02 | 0.0015 | 0.0030 | 0.0028 | Ti: 0.01 | 394 | 1.06 |
| 25 | J-J | 1.2-1.2 | 0.20 | 1.30 | 0.10 | 2.1 | 0.01 | 0.01 | 0.1 | 0.02 | 0.0015 | 0.0025 | 0.0022 | Ti: 0.01 | 394 | 1.06 |
| 26 | K-K | 1.2-1.2 | 0.20 | 1.50 | 0.33 | 5.0 | 0.01 | 0.3 | — | 0.02 | 0.0008 | 0.0031 | 0.0025 | Ca: 0.001, La: 0.001, Ce: 0.001 | 296 | 1.12 |
| <u>27</u> | L-L | 1.2-1.2 | 0.20 | 1.50 | 0.33 | <u>7.0</u> | 0.01 | 0.01 | — | 0.02 | 0.0008 | 0.0021 | 0.0039 | — | 235 | 1.12 |
| 28 | M-M | 1.2-1.2 | 0.20 | 0.45 | 0.05 | 1.2 | 9.0 | 0.01 | — | 0.02 | 0.0025 | 0.0025 | 0.0022 | — | 273 | 0.41 |

(⁺) Ms = 561 − 474 × C−33 × Mn-17 × Ni-17 × Cr-21 × Mo
Underline indicates being excluded from requirements of the manufacturing method of weld joint in the present invention.

TABLE 3

| Joint No. | Combination of steel sheets | Sheet thickness (mm) | Chemical composition (mass %) of weld metal Remainder: Fe and impurities | | | | | | | | | | | | Ms of steel sheet⁺ | Index α |
|---|---|---|---|---|---|---|---|---|---|---|---|---|---|---|---|---|
| | | | C | Si | Al | Mn | Ni | Cr | Mo | P | S | N | O | Others | | |
| <u>29</u> | N-N | 1.2-1.2 | 0.20 | 0.45 | 0.05 | 1.2 | <u>11.0</u> | 0.01 | — | 0.02 | 0.0025 | 0.0051 | 0.0028 | — | 239 | 0.41 |
| <u>30</u> | O-O | 1.2-1.2 | 0.20 | <u>3.20</u> | 0.04 | 2.4 | 0.01 | 0.01 | — | 0.02 | 0.0018 | 0.0034 | 0.0032 | — | 387 | <u>3.02</u> |
| <u>31</u> | P-P | 1.2-1.2 | 0.23 | 1.50 | 0.03 | 2.0 | 0.10 | 0.01 | — | 0.02 | 0.0012 | 0.0025 | 0.0032 | V: 0.03 | 384 | 1.12 |
| <u>32</u> | P-P | 1.2-1.2 | 0.23 | 1.50 | 0.03 | 2.0 | 0.10 | 0.01 | — | 0.02 | 0.0012 | 0.0025 | 0.0032 | V: 0.03 | 384 | 1.12 |
| 33 | P-P | 1.2-1.2 | 0.23 | 1.50 | 0.03 | 2.0 | 0.10 | 0.01 | — | 0.02 | 0.0012 | 0.0025 | 0.0032 | V: 0.03 | 384 | 1.12 |

TABLE 3-continued

| Joint No. | Combination of steel sheets | Sheet thickness (mm) | Chemical composition (mass %) of weld metal Remainder: Fe and impurities | | | | | | | | | | | | Ms of steel sheet[+] | Index α |
|---|---|---|---|---|---|---|---|---|---|---|---|---|---|---|---|---|
| | | | C | Si | Al | Mn | Ni | Cr | Mo | P | S | N | O | Others | | |
| 34 | P-P | 1.2-1.2 | 0.23 | 1.50 | 0.03 | 2.0 | 0.10 | 0.01 | — | 0.02 | 0.0012 | 0.0025 | 0.0032 | V: 0.03 | 384 | 1.12 |
| <u>35</u> | P-P | 1.2-1.2 | 0.23 | 1.50 | 0.03 | 2.0 | 0.10 | 0.01 | — | 0.02 | 0.0012 | 0.0025 | 0.0032 | V: 0.03 | 384 | 1.12 |
| 36 | Q-Q | 1.2-1.2 | 0.27 | 1.50 | 0.10 | 2.3 | 0.10 | 0.01 | — | 0.02 | 0.0009 | 0.0031 | 0.0038 | B: 0.002 | 355 | 0.95 |
| <u>37</u> | R-R | 1.2-1.2 | <u>0.32</u> | 1.80 | 0.10 | 2.2 | 0.01 | 0.01 | 0.2 | 0.02 | 0.0029 | 0.0034 | 0.0032 | Nb: 0.02, Ti: 0.02 | 332 | 1.52 |
| <u>38</u> | S-S | 1.2-1.2 | <u>0.40</u> | 1.30 | 0.40 | 2.0 | 0.01 | 0.2 | — | 0.02 | 0.0005 | 0.0041 | 0.0041 | — | 302 | 0.32 |
| <u>39</u> | T-T | 1.2-1.2 | <u>0.42</u> | 1.65 | 0.45 | 4.0 | 0.01 | 0.01 | — | 0.02 | 0.0015 | 0.0021 | 0.0049 | — | 230 | 0.82 |
| 40 | A-I | 1.2-1.2 | 0.11 | 0.70 | 0.08 | 1.4 | 0.01 | 0.01 | 0.05 | 0.03 | 0.0011 | 0.0027 | 0.0038 | Ti: 0.005 | 462 | 0.62 |
| 41 | A-J | 1.2-1.2 | 0.11 | 0.70 | 0.08 | 1.4 | 0.01 | 0.01 | 0.05 | 0.03 | 0.0011 | 0.0025 | 0.0035 | Ti: 0.005 | 462 | 0.62 |
| 42 | C-N | 1.2-1.2 | 0.14 | 0.48 | 0.04 | 1.6 | 5.5 | 0.01 | — | 0.03 | 0.0026 | 0.0038 | 0.0025 | Cu: 0.015 | 348 | 0.62 |
| 43 | C-O | 1.2-1.2 | 0.14 | 1.80 | 0.09 | 2.2 | 0.01 | 0.01 | — | 0.03 | 0.0022 | 0.0030 | 0.0027 | Cu: 0.015 | 422 | 1.86 |
| <u>44</u> | C-S | 1.2-1.2 | 0.24 | 1.08 | 0.04 | 2.0 | 0.01 | 0.11 | — | 0.03 | 0.0016 | 0.0033 | 0.0031 | — | 379 | 0.75 |
| 45 | C-S | 1.2-1.2 | 0.24 | 1.08 | 0.04 | 2.0 | 0.01 | 0.11 | — | 0.03 | 0.0016 | 0.0033 | 0.0031 | — | 379 | 0.75 |
| <u>46</u> | I-T | 1.2-1.2 | <u>0.31</u> | 1.48 | 0.08 | 3.1 | 0.01 | 0.01 | 0.05 | 0.02 | 0.0015 | 0.0026 | 0.0039 | Ti: 0.005 | 312 | 0.94 |
| <u>47</u> | A-E | 1.2-1.2 | 0.06 | 0.32 | 0.02 | 1.35 | 0.01 | 0.16 | — | 0.03 | 0.0017 | 0.0025 | 0.0043 | Ti: 0.02, B: 0.0005 | 485 | 0.50 |
| 48 | A-E | 1.2-1.2 | 0.06 | 0.32 | 0.02 | 1.35 | 0.01 | 0.16 | — | 0.03 | 0.0017 | 0.0025 | 0.0043 | Ti: 0.02, B: 0.0005 | 485 | 0.50 |
| 49 | A-E | 1.2-1.2 | 0.06 | 0.32 | 0.02 | 1.4 | 0.01 | 0.16 | — | 0.03 | 0.0017 | 0.0025 | 0.0043 | Ti: 0.02, B: 0.0005 | 483 | 0.50 |
| <u>50</u> | A-F | 1.2-1.2 | 0.06 | 0.23 | 0.01 | 1.4 | 0.01 | 0.16 | — | 0.03 | 0.0010 | 0.0025 | 0.0037 | Ti: 0.02, B: 0.0005 | 483 | <u>0.27</u> |
| <u>51</u> | D-S | 1.2-1.2 | 0.25 | 0.68 | 0.22 | 1.7 | 0.01 | 0.11 | — | 0.03 | 0.0014 | 0.0035 | 0.0035 | V: 0.1 | 384 | <u>0.29</u> |
| 52 | D-U | 1.2-1.2 | 0.25 | 0.68 | 0.22 | 1.7 | 0.01 | 0.11 | — | 0.03 | 0.0024 | 0.0034 | 0.0034 | V: 0.1 | 384 | 0.49 |
| <u>53</u> | D-V | 1.2-1.2 | 0.25 | 0.68 | 0.22 | 1.7 | 0.01 | 0.11 | — | 0.03 | <u>0.0131</u> | 0.0034 | 0.0034 | V: 0.1 | 384 | 2.63 |
| <u>54</u> | D-W | 1.2-1.2 | 0.25 | 0.68 | 0.22 | 1.7 | 0.01 | 0.11 | — | <u>0.11</u> | 0.0014 | 0.0034 | 0.0034 | V: 0.1 | 384 | <u>0.29</u> |
| 55 | D-X | 1.2-1.2 | 0.25 | 0.68 | 0.22 | 1.7 | 0.01 | 0.11 | — | 0.03 | 0.0015 | 0.0034 | 0.0064 | V: 0.1 | 384 | 0.31 |
| <u>56</u> | D-Y | 1.2-1.2 | 0.25 | 0.68 | 0.22 | 1.7 | 0.01 | 0.11 | — | 0.03 | 0.0014 | 0.0034 | <u>0.0114</u> | V: 0.1 | 384 | <u>0.29</u> |
| <u>57</u> | D-Z | 1.2-1.2 | 0.25 | 0.68 | 0.22 | 1.7 | 0.01 | 0.11 | — | 0.03 | 0.0014 | <u>0.0104</u> | 0.0034 | V: 0.1 | 384 | <u>0.29</u> |

[+]Ms = 561 − 474 × C−33 × Mn−17 × Ni−17 × Cr−21 × Mo
Underline indicates being excluded from requirements of the manufacturing method of weld joint in the present invention.

The following items are shown in the following Table 4 and Table 5.
(f) "Welding rate (m/min)"
(g) "Absolute humidity (g/m³)" ... absolute humidity in welding atmosphere
(h) "Retention time (min)" ... retention time of weld joint at 30° C., after welding is ended and before press forming is performed
(i) "Defined retention time (min)" ... time obtained by t=7000×C−400
(j) "Amount (mass %) of oxygen in weld metal" ... amount of oxygen after welding is ended Because a welding wire or insert metal was not used in this example, the chemical composition of weld metal was substantially the same as an average composition of steel sheets except for oxygen.

TABLE 4

| Joint No. | Welding conditions | | | | Amount (mass %) of oxygen in weld metal |
|---|---|---|---|---|---|
| | Welding rate (m/min) | Absolute humidity (g/m³) | Retention time (min) after welding | Defined retention time (min) | |
| <u>1</u> | 3 | 15 | 10 | <0 | 0.0054 |
| <u>2</u> | 3 | 15 | <u>10</u> | 20 | 0.0038 |
| 3 | 3 | 15 | 180 | 20 | 0.0038 |
| 4 | 3 | 15 | 1080 | 160 | 0.0027 |
| 5 | 3 | 15 | 300 | 160 | 0.0027 |
| <u>6</u> | 3 | 15 | <u>60</u> | 160 | 0.0027 |
| <u>7</u> | <u>15</u> | 15 | 300 | 160 | 0.0027 |
| <u>8</u> | 3 | 15 | 1080 | 300 | 0.0034 |
| 9 | 3 | 15 | 1080 | 300 | 0.0044 |
| 10 | 3 | 15 | 1080 | 300 | 0.0031 |
| 11 | 3 | 15 | 1080 | 370 | 0.0031 |
| 12 | 3 | 15 | 1080 | 650 | 0.0028 |
| 13 | 3 | 15 | 1200 | 1000 | 0.0034 |
| 14 | 7 | 15 | 1200 | 1000 | 0.0034 |
| <u>15</u> | <u>10</u> | 15 | 1200 | 1000 | 0.0034 |
| <u>16</u> | <u>15</u> | 15 | 1200 | 1000 | 0.0034 |
| <u>17</u> | 3 | <u>4</u> | 1200 | 1000 | 0.0030 |
| 18 | 3 | 7 | 1200 | 1000 | 0.0031 |
| 19 | 3 | 23 | 1200 | 1000 | 0.0037 |
| <u>20</u> | 3 | <u>27</u> | 1200 | 1000 | 0.0039 |
| <u>21</u> | 3 | <u>35</u> | 1200 | 1000 | 0.0042 |
| <u>22</u> | 3 | 15 | <u>900</u> | 1000 | 0.0034 |
| <u>23</u> | 3 | 15 | <u>600</u> | 1000 | 0.0034 |
| 24 | 3 | 15 | 1200 | 1000 | 0.0034 |
| 25 | 3 | 15 | 1200 | 1000 | 0.0028 |
| 26 | 3 | 15 | 1200 | 1000 | 0.0031 |
| <u>27</u> | 3 | 15 | 1200 | 1000 | 0.0045 |
| 28 | 3 | 15 | 1200 | 1000 | 0.0028 |

Underline indicates being excluded from requirements of the manufacturing method of weld joint in the present invention.

TABLE 5

| Joint No. | Welding conditions | | | | Amount (mass %) of oxygen in weld metal |
|---|---|---|---|---|---|
| | Welding rate (m/min) | Absolute humidity (g/m³) | Retention time (min) after welding | Defined retention time (min) | |
| <u>29</u> | 3 | 15 | 1200 | 1000 | 0.0034 |
| <u>30</u> | 3 | 15 | 1200 | 1000 | 0.0038 |

TABLE 5-continued

| | Welding conditions | | | | Amount |
|---|---|---|---|---|---|
| Joint No. | Welding rate (m/min) | Absolute humidity (g/m³) | Retention time (min) after welding | Defined retention time (min) | (mass %) of oxygen in weld metal |
| 31 | 3 | 15 | <u>1080</u> | 1210 | 0.0038 |
| 32 | 3 | <u>4</u> | 1440 | 1210 | 0.0034 |
| 33 | 3 | <u>7</u> | 1440 | 1210 | 0.0035 |
| 34 | 3 | 15 | 1440 | 1210 | 0.0038 |
| 35 | 3 | <u>30</u> | 1440 | 1210 | 0.0044 |
| 36 | 3 | 15 | 2160 | 1490 | 0.0044 |
| 37 | 3 | 15 | 2880 | 1840 | 0.0038 |
| 38 | 3 | 15 | 2880 | 2400 | 0.0047 |
| 39 | 3 | 15 | 2880 | 2540 | 0.0055 |
| 40 | 3 | 15 | 1080 | 370 | 0.0044 |
| 41 | 3 | 15 | 1080 | 370 | 0.0041 |
| 42 | 3 | 15 | 1080 | 580 | 0.0031 |
| 43 | 3 | 15 | 1080 | 580 | 0.0033 |
| 44 | 3 | 15 | <u>1080</u> | 1280 | 0.0037 |
| 45 | 3 | 15 | 1920 | 1280 | 0.0037 |
| 46 | 3 | 15 | 2880 | 1770 | 0.0045 |
| 47 | 3 | <u>4</u> | 180 | 20 | 0.0045 |
| 48 | 3 | <u>7</u> | 180 | 20 | 0.0046 |
| 49 | 3 | 15 | 180 | 20 | 0.0049 |
| 50 | 3 | 15 | 180 | 20 | 0.0043 |
| 51 | 3 | 15 | 1440 | 1350 | 0.0041 |
| 52 | 3 | 15 | 1440 | 1350 | 0.0040 |
| 53 | 3 | 15 | 1440 | 1350 | 0.0040 |
| 54 | 3 | 15 | 1440 | 1350 | 0.0040 |
| 55 | 3 | 15 | 1440 | 1350 | 0.0070 |
| 56 | 3 | 15 | 1440 | 1350 | <u>0.0120</u> |
| 57 | 3 | 15 | 1440 | 1350 | 0.0040 |

Underline indicates being excluded from requirements of the manufacturing method of weld joint in the present invention.

Then, a draw bending test which will be described later was performed on each of the weld joints 1 to 57, and it was examined whether or not a crack occurred in weld metal. The following items are shown in the following Table 6 and Table 7.

(k) "$HV_{WM}$ (HV)" . . . average hardness of weld metal (l) "Porosity distribution density (pieces/mm²)" . . . distribution density of porosities having a diameter of 2 μm to 50 μm in weld metal (m) "Inclusion distribution density (pieces/mm²)" . . . distribution density of oxide inclusions having a diameter of 3 μm or more in weld metal (n) "$C_H$ (mass ppm)" . . . amount $C_H$ of diffusible hydrogen in weld metal (o) "Right side value in Expression (5)" . . . value of $3.57-0.0066 \times HV_{WM}$ (p) "Crystal structure of martensite" . . . crystal structure of martensite in weld metal (q) "State of occurrence of crack" . . . whether or not a crack occurs, determined by a draw bending test which is performed during a period when a retention time elapses In all of the weld joints 1 to 57, the main metallographic structure was martensite. In Table 6 and Table 7, a weld joint in which a crystal structure of martensite is indicated as bcc means that the main metallographic structure of weld metal is a martensite structure of a bcc structure. A weld joint indicated as bct means that the main metallographic structure of weld metal is a martensite structure of a bct structure.

The crystal structure of martensite was specified by an X-ray diffraction method. Specifically, lattice constants of an a axis and a c axis of a {100} plane were measured by an X-ray diffraction method, and it was determined whether the crystal structure was cubic (bcc) or a tetragonal (bct), from an axis ratio c/a. In a case where a value of c/a was equal to or less than 1.007, it was assumed that a structure of martensite was a bcc structure.

TABLE 6

| Joint No. | $HV_{WM}$ (HV) | Distribution density (pieces/mm²) of porosities | Distribution density (pieces/mm²) of inclusions | $C_H$ (mass ppm) | Right side value in expression (5) | Crystal structure of martensite | State of occurrence of crack | Note |
|---|---|---|---|---|---|---|---|---|
| <u>1</u> | <u>328</u> | <u>6.6</u> | 0.54 | 2.300 | 1.405 | bcc | None | Comparative example |
| <u>2</u> | 372 | 1.6 | 0.38 | 2.200 | 1.115 | bcc | Occurrence | Comparative example |
| 3 | 370 | 1.6 | 0.38 | 1.010 | 1.128 | bcc | None | Example of the invention |
| 4 | 385 | 1.4 | 0.27 | 0.350 | 1.029 | bcc | None | Example of the invention |
| 5 | 390 | 1.4 | 0.27 | 0.850 | 0.996 | bcc | None | Example of the invention |
| <u>6</u> | 385 | 1.4 | 0.27 | 1.220 | 1.029 | bcc | Occurrence | Comparative example |
| <u>7</u> | 399 | <u>5.7</u> | 0.27 | 0.980 | 0.937 | bcc | Occurrence | Comparative example |
| <u>8</u> | 401 | <u>5.3</u> | 0.34 | 0.230 | 0.923 | bcc | Occurrence | Comparative example |
| 9 | 401 | 1.1 | 0.44 | 0.310 | 0.923 | bcc | None | Example of the invention |
| 10 | 401 | 3.0 | 0.31 | 0.160 | 0.923 | bcc | None | Example of the invention |
| 11 | 409 | 2.2 | 0.31 | 0.270 | 0.871 | bcc | None | Example of the invention |
| 12 | 442 | 2.4 | 0.28 | 0.300 | 0.653 | bcc | None | Example of the invention |
| 13 | 482 | 1.1 | 0.34 | 0.300 | 0.389 | bcc | None | Example of the invention |
| 14 | 485 | 4.8 | 0.34 | 0.290 | 0.369 | bcc | None | Example of the invention |
| <u>15</u> | 485 | <u>5.4</u> | 0.34 | 0.340 | 0.369 | bcc | Occurrence | Comparative example |
| <u>16</u> | 495 | <u>5.9</u> | 0.34 | 0.380 | 0.303 | bcc | Occurrence | Comparative example |
| <u>17</u> | 485 | 0.8 | <u>0.08</u> | 0.260 | 0.369 | bcc | Occurrence | Comparative example |
| 18 | 485 | 0.8 | 0.14 | 0.300 | 0.369 | bcc | None | Example of the invention |
| 19 | 480 | 1.1 | 0.57 | 0.350 | 0.402 | bcc | None | Example of the invention |
| <u>20</u> | 480 | 1.1 | 1.90 | 0.430 | 0.402 | bcc | Occurrence | Comparative example |
| <u>21</u> | 485 | 1.1 | 2.40 | 0.520 | 0.369 | bcc | Occurrence | Comparative example |
| <u>22</u> | 485 | 1.1 | 0.34 | 0.390 | 0.369 | bcc | Occurrence | Comparative example |
| <u>23</u> | 485 | 1.1 | 0.34 | 0.420 | 0.369 | bcc | Occurrence | Comparative example |
| 24 | 480 | 1.1 | 0.34 | 0.300 | 0.402 | bcc | None | Example of the invention |
| 25 | 490 | 0.9 | 0.28 | 0.170 | 0.336 | bcc | None | Example of the invention |
| 26 | 479 | 0.9 | 0.31 | 0.300 | 0.409 | bcc | None | Example of the invention |
| <u>27</u> | 525 | 1.1 | 0.45 | 0.300 | 0.105 | bct | Occurrence | Comparative example |
| 28 | 480 | 2.2 | 0.28 | 0.250 | 0.402 | bcc | None | Example of the invention |

Underline indicates being excluded from requirements of the manufacturing method of weld joint in the present invention.

TABLE 7

| Joint No. | $HV_{WM}$ (HV) | Distribution density (pieces/mm$^2$) of porosities | Distribution density (pieces/mm$^2$) of inclusions | $C_H$ (mass ppm) | Right side value in expression (5) | Crystal structure of martensite | State of occurrence of crack | Note |
|---|---|---|---|---|---|---|---|---|
| <u>29</u> | 523 | 2.2 | 0.34 | 0.270 | 0.118 | bct | Occurrence | Comparative example |
| <u>30</u> | 485 | 3.7 | 0.38 | 0.450 | 0.369 | bcc | Occurrence | Comparative example |
| <u>31</u> | 505 | 0.9 | 0.38 | 0.310 | 0.237 | bcc | Occurrence | Comparative example |
| <u>32</u> | 510 | 0.9 | <u>0.04</u> | 0.150 | 0.204 | bcc | Occurrence | Comparative example |
| 33 | 505 | 0.9 | 0.16 | 0.170 | 0.237 | bcc | None | Example of the invention |
| 34 | 510 | 0.9 | 0.38 | 0.190 | 0.204 | bcc | None | Example of the invention |
| <u>35</u> | 510 | 0.9 | 1.60 | 0.220 | 0.204 | bcc | Occurrence | Comparative example |
| 36 | 539 | 1.3 | 0.44 | 0.007 | 0.013 | bcc | None | Example of the invention |
| <u>37</u> | <u>575</u> | <u>11.2</u> | 0.38 | 0.002 | <0 | bcc | Occurrence | Comparative example |
| <u>38</u> | <u>644</u> | 3.3 | 0.47 | 0.002 | <0 | bcc | Occurrence | Comparative example |
| <u>39</u> | <u>644</u> | 1.6 | 0.55 | 0.002 | <0 | bcc | Occurrence | Comparative example |
| 40 | 407 | 1.4 | 0.44 | 0.350 | 0.884 | bcc | None | Example of the invention |
| 41 | 405 | 1.6 | 0.41 | 0.190 | 0.897 | bcc | None | Example of the invention |
| 42 | 430 | 1.6 | 0.31 | 0.280 | 0.732 | bcc | None | Example of the invention |
| 43 | 440 | 0.5 | 0.33 | 0.370 | 0.666 | bcc | None | Example of the invention |
| <u>44</u> | 525 | 1.3 | 0.37 | 0.290 | 0.105 | bcc | Occurrence | Comparative example |
| 45 | 525 | 0.9 | 0.37 | 0.080 | 0.105 | bcc | None | Example of the invention |
| <u>46</u> | <u>565</u> | 1.1 | 0.45 | 0.020 | <0 | bcc | Occurrence | Comparative example |
| <u>47</u> | 380 | 1.7 | <u>0.03</u> | 0.69 | 1.062 | bcc | Occurrence | Comparative example |
| 48 | 384 | 1.5 | 0.20 | 0.82 | 1.036 | bcc | None | Example of the invention |
| 49 | 383 | 1.6 | 0.49 | 0.95 | 1.042 | bcc | None | Example of the invention |
| <u>50</u> | 383 | <u>5.1</u> | 0.43 | 0.88 | 1.042 | bcc | Occurrence | Comparative example |
| <u>51</u> | 520 | <u>5.7</u> | 0.41 | 0.08 | 0.138 | bcc | Occurrence | Comparative example |
| 52 | 525 | 1.8 | 0.40 | 0.08 | 0.105 | bcc | None | Example of the invention |
| <u>53</u> | 525 | 0.0 | 0.40 | 0.08 | 0.105 | bcc | Occurrence | Comparative example |
| <u>54</u> | 520 | 3.3 | 0.40 | 0.08 | 0.138 | bcc | Occurrence | Comparative example |
| 55 | 520 | 3.3 | 2.3 | 0.08 | 0.138 | bcc | None | Example of the invention |
| <u>56</u> | 515 | 3.3 | <u>8.5</u> | 0.08 | 0.171 | bcc | Occurrence | Comparative example |
| <u>57</u> | 515 | 3.3 | 0.45 | 0.08 | 0.171 | bcc | Occurrence | Comparative example |

Underline indicates being excluded from requirements of the manufacturing method of weld joint in the present invention.

The chemical composition of weld metal was obtained by a method described in the above-described section of "5. Obtaining method of chemical composition of weld metal". Average hardness (HV) of weld metal was obtained in a manner as follows. Firstly, a weld joint was cut in a direction vertical to an elongation direction of a welding line and a cross-sectional sample for measuring hardness was produced. Hardness at four points of weld metal in the cross-sectional sample was measured with a load of 500 gf or more, by using a Vickers hardness tester. An average value of measured hardness at four points was calculated, and was set as average hardness. A measurement point was set to have a point of ¼t (t was a thickness of the weld metal in a sheet thickness direction of the weld joint) from a surface of the weld metal.

The distribution density of porosities having a diameter of 2 μm to 50 μm in weld metal was obtained in a manner as follows. Firstly, a weld joint was cut in a direction vertical to an elongation direction of a welding line and a cross section obtained by the cutting was subjected to mirror polishing. A portion corresponding to weld metal in the cross section subjected to mirror polishing is observed by a SEM, and the number of porosities having a diameter of 2 μm to 50 μm is counted. The obtained number of porosities is divided by an observation area, and a value obtained by the division is set as distribution density of porosities. SEM observation was performed on three or more different cross sections such that an observation area was set to be equal to or more than 5 mm$^2$. Because a porosity has various shapes, evaluation was performed by using an equivalent circle diameter of the same area.

Regarding the distribution density of oxide inclusions having a diameter of 3 μm or more in weld metal, the same sample as that in porosity observation is used. The cross section subjected to mirror polishing is observed by a SEM, and the number of oxide inclusions having an equivalent circle diameter of 3 μm or more is counted. SEM observation was performed on three or more different cross sections such that an observation area was set to be equal to or more than 5 mm$^2$. In a case where it was not possible to distinguish a porosity from an inclusion based on only a SEM image, analysis of oxygen and other elements was performed by using EDS mounted in a SEM. In a case where an element constituting an inclusion was not recognized, determination to be a porosity was performed.

The amount of diffusible hydrogen contained in weld metal was measured in a manner as follows. Firstly, a sample which included weld metal and was used for measuring the amount of diffusible hydrogen was cut from each of the weld joints. The sample which had been cut out was heated at a heating rate of 100° C./h. Hydrogen discharged from the sample when heating was performed from room temperature to 200° C. was measured by gas chromatography, and the measured value was set as an amount $C_H$ of diffusible hydrogen shown in Table 6 and Table 7. Hydrogen contained in a steel sheet before welding was an amount as small as could be ignored. Thus, in this example, it was assumed that hydrogen was not contained in a steel sheet and hydrogen was contained only in weld metal. On this assumption, the amount of diffusible hydrogen in weld metal was calculated from the mass of the weld metal and an amount of hydrogen measured in the above-described manner. The mass of the weld metal was calculated by the following Expression (8). In the following Expression (8), Aw indicates a mass of weld metal. At indicates a mass of the sample. Ww indicates a width of the weld metal. Wt indicates a width (length in a direction vertical to an elongation direction of a welding line) of the sample.

$$Aw = At \times Ww/Wt \qquad \text{Expression (8)}$$

The width Ww of weld metal was obtained in a manner as follows. Firstly, the sample was cut in a direction vertical to an elongation direction of a welding line, and a width at each of positions of ⅛t (t indicates a thickness of weld metal), ¼t, ½t, ¾t, and ⅞t from a surface of weld metal was measured. An average value of measured width of five points was calculated, and the calculated average value was set as the width Ww of weld metal.

A metallographic structure of weld metal was observed by a SEM. Specifically, a sample which included weld metal and was used for observing a metallographic structure was cut from each of the weld joints. A cross section of weld metal in the sample which had been cut out was observed by a SEM. The crystal structure of martensite in weld metal was samely determined by an X-ray diffraction method.

Figure 3:
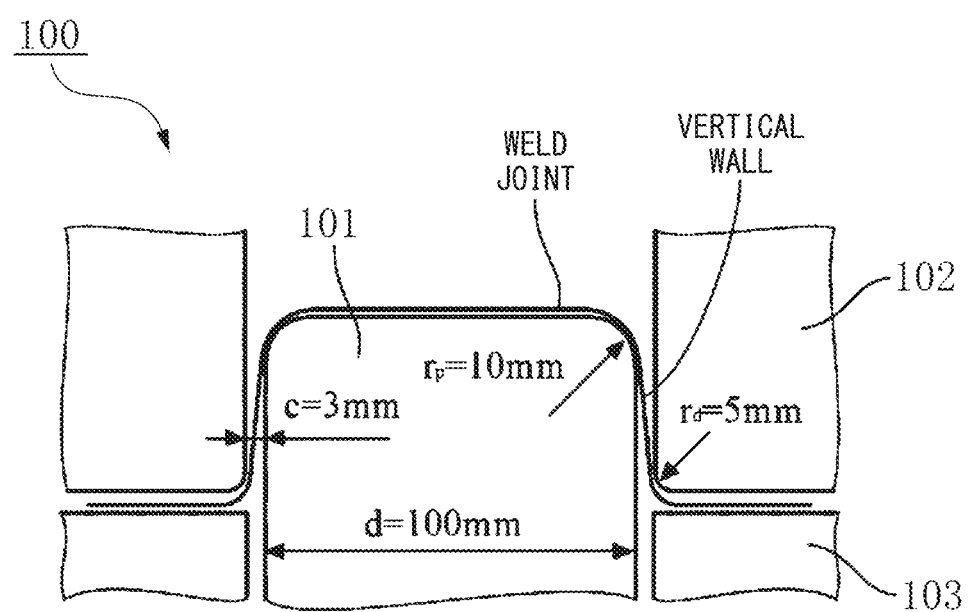
FIG. 3 is a schematic diagram illustrating a method of a draw bending test.

Next, a draw bending test will be described. In the draw bending test, firstly, lubricant oil was applied onto both sides of each of the above-described weld joints 1 to 57. Press forming (hat forming) was performed on each of the weld joints 1 to 57 at room temperature and a punch speed of 60 mm/min by using a press test device 100. The press test device 100 includes a punch 101, a dice 102, and a blank holder 103 which are illustrated in FIG. 3. As illustrated in FIG. 3, a diameter d of the punch 101 in the press test device 100 was set to 100 mm. A radius $r_p$ of a shoulder of the punch was set to 10 mm. A radius $r_d$ of a shoulder of the dice was set to 5 mm. A clearance c between the punch 101 and the dice 102 was set to 3 mm. A blank holding force (BHF) by the blank holder 103 when press forming was performed was adjusted such that tensile strength applied to a vertical wall of the weld joint during press forming was 0.5 times tensile strength of one having low strength among two steel sheets which were joined to each other. A forming height was set to 60 mm. The weld joint was installed in the press test device so as to cause a welding line to pass through a substantially center of an upper surface of the punch.

Weld metal of each of the weld joints 1 to 57 after press forming was visually observed by a magnifier, and it was examined whether or not a crack occurred. As a result, as shown in Table 6 and Table 7, in the weld joint according to the example of the present invention, a crack in weld metal after press forming was not confirmed.

In a weld joint 1 according to a comparative example, porosity distribution density was increased by a small weld pool fluidity index α. Thus, it was supposed that an influence of internal pressure by non-diffusible hydrogen in a porosity was largely received. However, in the weld joint 1, since the average hardness of weld metal was small, a crack in the weld metal was not confirmed.

In weld joints 2, 6, 22, 23, 31, and 44 according to the comparative example, it is supposed that the retention time is short, and thus it is not possible to sufficiently reduce internal pressure by non-diffusible hydrogen in a porosity, and a crack occurs from the porosity as a starting point in a draw bending test.

In weld joints 7, 15, and 16 according to the comparative example, it is supposed that the welding rate is fast, and thus it is not possible to suppress an amount of porosities, and an influence of internal pressure by non-diffusible hydrogen in a porosity causes a crack to occur from the porosity as a starting point in a draw bending test. In a weld joint 15, it is supposed that a value of $C_H$ indicating an amount of hydrogen in metal lattice can be reduced to an appropriate value, but, diffusion of the amount of non-diffusible hydrogen in a porosity is insufficient, and an influence of internal pressure causes a crack to occur from the porosity as a starting point in a draw bending test.

In a weld joint 8 according to the comparative example, porosity distribution density was increased by a small weld pool fluidity index α. Thus, it is supposed that it is not possible to sufficiently reduce internal pressure by non-diffusible hydrogen in a porosity, and a crack occurs from the porosity as a starting point in a draw bending test.

In a weld joint 17 according to the comparative example, absolute humidity in welding was low, and thus it was not possible to sufficiently increase distribution density of oxide inclusions. It is supposed as follows. The value of $C_H$ indicating an amount of hydrogen in metal lattice can be reduced to an appropriate value, but it is not possible to sufficiently obtain an effect of trapping diffusible hydrogen by oxide inclusions. Thus, it is not possible to sufficiently reduce internal pressure by non-diffusible hydrogen in a porosity and a crack occurs from the porosity as a starting point in a draw bending test.

In weld joints 20, 21, and 35 according to the comparative example, it is supposed that absolute humidity in welding is high, and thus it is not possible to sufficiently reduce internal pressure by non-diffusible hydrogen in a porosity and a crack occurs from the porosity as a starting point in a draw bending test.

In a weld joint 27 according to the comparative example, it is supposed that the content of Mn at a melted metal portion is excessive, and thus weld metal is enbrittled, and a crack occurs in the weld metal.

In a weld joint 29 according to the comparative example, it is supposed that the content of Ni at a melted metal portion is excessive, and thus weld metal is enbrittled, and a crack occurs in the weld metal.

In a weld joint 30 according to the comparative example, it is supposed as follows. The content of Si at a melted metal portion is excessive, and thus, the amount $C_H$ of hydrogen in metal lattice is excessive. Thus, it is not possible to sufficiently reduce internal pressure by non-diffusible hydrogen in a porosity and a crack occurs from the porosity as a starting point in a draw bending test.

In weld joints 32 and 47 according to the comparative example, absolute humidity in welding was low, and thus it was not possible to sufficiently increase distribution density of oxide inclusions. It is supposed as follows. The value of $C_H$ indicating an amount of hydrogen in metal lattice can be reduced to an appropriate value, but it is not possible to sufficiently obtain an effect of trapping diffusible hydrogen by oxide inclusions. Thus, it is not possible to sufficiently reduce internal pressure by non-diffusible hydrogen in a porosity and a crack occurs from the porosity as a starting point in a draw bending test.

In weld joints 37, 38, 39, and 46 according to the comparative example, it is supposed that the content of C at a melted metal portion is excessive, and thus average hardness of weld metal deviates a suitable range, and a crack occurs in the weld metal.

In weld joints 50 and 51 according to the comparative example, porosity distribution density was increased by a small weld pool fluidity index α. Thus, it is supposed that an influence of internal pressure by non-diffusible hydrogen in a porosity causes a crack to occur by from the porosity as a starting point in a draw bending test.

In a weld joint 53 according to the comparative example, it is supposed that the content of S at a melted metal portion is excessive, and thus a crack occurs in the weld metal.

In a weld joint 54 according to the comparative example, it is supposed that the content of P at a melted metal portion is excessive, and thus a crack occurs in the weld metal.

In a weld joint 56 according to the comparative example, it is supposed that the content of O at a melted metal portion is excessive, and thus oxide inclusions are excessively generated and a crack occurs in the weld metal.

In a weld joint 57 according to the comparative example, it is supposed that the content of N at a melted metal portion is excessive, and thus a crack occurs in the weld metal.

As described above, in the weld joint according to the present invention, even in a laser welded joint using a high-strength steel sheet in which tensile strength is higher than 350 MPa, it is possible to suppress the occurrence of a crack in weld metal when press forming is performed. That is, according to the weld joint of the present invention, it is understood that excellent formability is obtained.

INDUSTRIAL APPLICABILITY

According to the present invention, even in a case where a laser welded joint including a high-strength steel sheet is press-formed, it is possible to prevent the occurrence of a crack in weld metal. Thus, for example, even in a case using a high-strength steel sheet which has a high carbon equivalent, it is possible to integrally manufacture components by tailored blank and to realize reduction in weight of a vehicle body and improvement of safety. The laser welded joint according to the present invention can be also used as a panel component and a chassis component, in addition to a frame component of a vehicle body.

The invention claimed is:

1. A laser welded joint comprising:
  weld metal provided between a plurality of steel sheets,
  wherein, the weld metal contains, as a chemical composition, by mass %,
  0.05% to 0.30% of C,
  0.45% to 3.0% of Si,
  0.005% to 1.0% of Al,
  0.5% to 6.0% of Mn,
  more than 0% and 0.04% or less of P,
  more than 0% and 0.01% or less of S,
  more than 0% and 0.01% or less of N,
  more than 0% and 0.01% or less of O,
  0% to 1.0% of Cu,
  0% to 0.2% of Nb+Ti+V,
  0% to 0.01% of Ca+REM,
  0% to 0.01% of B,
  0% to 5.0% of Cr,
  0% to 10.0% of Ni,
  0% to 1.0% of Mo, and
  a remainder consisting of Fe and impurities,
  $0.3 \leq Si+200 \times S-2.7 \times C \leq 3.0$ is satisfied,
  average hardness of the weld metal is 350 to 540 in Vickers hardness,
  distribution density of porosities having a diameter of 2 μm to 50 μm in the weld metal is equal to or less than 5.0 pieces/mm$^2$, and
  distribution density of oxide inclusions having a diameter of 3 μm or more in the weld metal is 0.1 to 8.0 pieces/mm$^2$.

2. The laser welded joint according to claim 1,
  wherein at least one selected from the group consisting of 0.0001% to 1.0% of Cu,
  0.0001% to 0.2% of Nb+Ti+V,
  0.0001% to 0.01% of Ca+REM,
  0.0001% to 0.01% of B,
  0.0001% to 5.0% of Cr,
  0.0001% to 10.0% of Ni, and
  0.0001% to 1.0% of Mo
  is contained as the chemical composition of the weld metal, by mass %.

3. The laser welded joint according to claim 1,
  wherein an amount $C_H$ of diffusible hydrogen in the weld metal satisfies the following Expression (1) in a unit of mass ppm:

$$C_H \leq 3.570 - 0.0066 \times HV_{WM} \quad \text{Expression (1)}$$

wherein $HV_{WM}$ in Expression (1) indicates average hardness of the weld metal in Vickers hardness.

4. The laser welded joint according to claim 1,
  wherein 80% or more of a metallographic structure in the weld metal is martensite, and
  a structure of the martensite is a bee structure.

5. The laser welded joint according to claim 1,
  wherein a value of Ms represented by the following Expression (2) is equal to or more than 250:

$$Ms = 561 - 474 \times C - 33 \times Mn - 17 \times Ni - 17 \times Cr - 21 \times Mo \quad \text{Expression (2)}$$

6. The laser welded joint according to claim 1,
  wherein at least one of the plurality of steel sheets is a plated steel sheet.

7. The laser welded joint according to claim 1, wherein a thickness of each of the plurality of steel sheets is 0.5 to 4.0 mm.

8. A vehicle component comprising:
  the laser welded joint according to claim 1.

9. A manufacturing method of a vehicle component, which performs press forming on the laser welded joint according to claim 1.

10. A manufacturing method of a laser welded joint which is the laser welded joint according to claim 1, the method comprising:
  performing laser welding of a plurality of steel sheets at a welding rate of 8 in/min or slower in an atmosphere in which absolute humidity is equal to or less than 5 to 25 g/m$^3$, so as to form weld metal for joining the plurality of steel sheets; and
  retaining the plurality of steel sheets after welding, in a temperature range of 10° C. to 100° C. for a time defined by the following Expression (3),
  wherein the weld metal contains, as a chemical composition, by mass %,
  0.05% to 0.30% of C,
  0.005% to 3.0% of Si,
  0.005% to 1.0% of Al,
  0.5% to 6.0% of Mn,
  more than 0% and 0.04% or less of P,
  more than 0% and 0.01% or less of S,
  more than 0% and 0.01% or less of N,
  more than 0% and 0.01% or less of 0,
  0% to 1.0% of Cu,
  0% to 0.2% of Nb+Ti+V,
  0% to 0.01% of Ca+REM,
  0% to 0.01% of B,
  0% to 5.0% of Cr,
  0% to 10.0% of Ni,
  0% to 1.0% of Mo, and
  a remainder consisting of Fe and impurities, and
  $0.3 \leq Si+200 \times S-2.7 \times C \leq 3.0$ is satisfied, $$t \geq 7000 \times C - 400 \quad \text{Expression(3)}$$

wherein in Expression (3), t indicates a time in a unit of minute.

11. The manufacturing method of a laser welded joint according to claim 10,
wherein the weld metal contains, as the chemical composition, by mass %, at least one selected from the group consisting of
0.0001% to 1.0% of Cu,
0,0001% to 0.2% of Nb+Ti+V,
0.0001% to 0.01% of Ca+REM,
0.0001% to 0.01% of B,
0,0001% to 5.0% of Cr,
0,0001% to 10.0% of Ni, and
0.0001% to 1.0% of Mo.

12. The manufacturing method of a laser welded joint according to claim 10,
wherein a value of Ms represented by the following Expression (4) is equal to or more than 250:

$$Ms=561-474\times C-33Mn-17\times Ni-17\times Cr-21\times Mo \qquad \text{Expression(4)}.$$

13. The manufacturing method of a laser welded joint according to claim 10,
wherein at least one of the plurality of steel sheets is a plated steel sheet.

14. A manufacturing method of a vehicle component, which performs press forming on the laser welded joint manufactured by the manufacturing method according to claim 10.

* * * * *